US012559993B2

(12) United States Patent
Laubenberger et al.

(10) Patent No.: US 12,559,993 B2
(45) Date of Patent: Feb. 24, 2026

(54) AIRCRAFT SEAT MODULE

(71) Applicant: RECARO Aircraft Seating GmbH & Co. KG, Schwaebisch Hall (DE)

(72) Inventors: Joerg Laubenberger, Murrhardt (DE); Michael Streckert, Schwaebisch Hall (DE); Christopher Kaufmann, Buehlertann (DE); Juergen Mehmel, Schwaebisch Hall (DE); Michael Fritz, Rosengarten (DE); Alexander Rechlin, Schwaebisch Hall (DE)

(73) Assignee: RECARO Aircraft Seating GmbH & Co. KG, Schwäbisch Hall (DE)

(*) Notice: Subject to any disclaimer, the term of this patent is extended or adjusted under 35 U.S.C. 154(b) by 415 days.

(21) Appl. No.: 18/001,361

(22) PCT Filed: May 17, 2021

(86) PCT No.: PCT/EP2021/063027
§ 371 (c)(1),
(2) Date: Apr. 28, 2023

(87) PCT Pub. No.: WO2021/249727
PCT Pub. Date: Dec. 16, 2021

(65) Prior Publication Data

US 2023/0265687 A1 Aug. 24, 2023

(30) Foreign Application Priority Data

Jun. 12, 2020 (DE) ..................... 10 2020 115 567.0

(51) Int. Cl.
*E05B 81/08* (2014.01)
*B64D 11/06* (2006.01)
(Continued)

(52) U.S. Cl.
CPC .......... *E05B 81/08* (2013.01); *B64D 11/0606* (2014.12); *E05B 41/00* (2013.01);
(Continued)

(58) Field of Classification Search
CPC .......... E05B 81/08; E05B 81/18; E05B 81/28; E05B 81/70; E05B 41/00; E05C 1/08;
(Continued)

(56) References Cited

U.S. PATENT DOCUMENTS 9,758,996 B2 * 9/2017 Olsson ................ E05B 17/0045
9,920,559 B2 * 3/2018 Druckman ............ E06B 3/4636
(Continued)

FOREIGN PATENT DOCUMENTS

CN 110593649 A * 12/2019 ........... E05B 17/186
DE 102 46 643 A1 4/2004
(Continued)

OTHER PUBLICATIONS

German Search Report issued Apr. 6, 2022 in corresponding DE Application No. 10 2020 115 567.0 (and English translation).
(Continued)

*Primary Examiner* — Steven A Tullia
(74) *Attorney, Agent, or Firm* — Posz Law Group, PLC

(57) ABSTRACT

An aircraft seat module has an enclosure unit which at least partially delimits a flight passenger seating area, and has a door unit which at least in an operating state is at least configured to close a passage region to the flight passenger seating area, has a bearing device which is configured to support the door unit so as to be movable between an open position and a closed position in relation to the enclosure unit, and has a locking device which is configured to lock the door unit in the open position, wherein the locking device has at least one electrically and/or electronically actuatable actuator device, which is at least configured to be electrically
(Continued)

and/or electronically actuated for an unlocking of the door unit.

18 Claims, 9 Drawing Sheets

(51) Int. Cl.

| | |
|---|---|
| ***E05B 41/00*** | (2006.01) |
| ***E05B 81/18*** | (2014.01) |
| ***E05B 81/28*** | (2014.01) |
| ***E05B 81/70*** | (2014.01) |
| ***E05C 1/08*** | (2006.01) |
| ***E05C 17/60*** | (2006.01) |

(52) U.S. Cl.
CPC .............. *E05B 81/18* (2013.01); *E05B 81/28* (2013.01); *E05B 81/70* (2013.01); *E05C 1/08* (2013.01); *E05C 17/60* (2013.01)

(58) Field of Classification Search
CPC ..... E05C 17/60; E05C 17/56; B64D 11/0606; B64D 11/06; Y10T 292/0809
See application file for complete search history.

(56) References Cited

U.S. PATENT DOCUMENTS

| | | | | |
|---|---|---|---|---|
| 10,179,650 | B2 * | 1/2019 | Morgan | B64D 11/0606 |
| 10,279,912 | B2 * | 5/2019 | Robinson | B64D 11/0605 |
| 10,562,633 | B2 * | 2/2020 | Kuyper | B64D 11/0602 |
| 10,926,879 | B2 * | 2/2021 | Bonnefoy | B64D 11/0023 |
| 11,084,587 | B2 * | 8/2021 | Robinson | B64C 1/1423 |
| 11,174,029 | B2 * | 11/2021 | Nicholas | B64D 11/0606 |
| 11,255,114 | B2 * | 2/2022 | Konrad | E05B 83/40 |
| 11,708,162 | B2 * | 7/2023 | Ivanov | B64D 11/0602 244/118.6 |
| 11,999,486 | B2 * | 6/2024 | Thomas | B64D 11/0023 |
| 12,030,642 | B2 * | 7/2024 | Jasny | E05B 47/00 |
| 12,043,389 | B2 * | 7/2024 | Wills | E05C 19/04 |
| 12,187,434 | B2 * | 1/2025 | Yates | E05B 63/143 |
| 2013/0241247 | A1 * | 9/2013 | Wallace | B64D 11/0604 297/118 |
| 2017/0106980 | A1 * | 4/2017 | Kuyper | B64D 11/0604 |
| 2018/0281963 | A1 * | 10/2018 | Dowty | B64D 11/0606 |
| 2020/0224462 | A1 * | 7/2020 | Renner | E05B 47/026 |
| 2021/0163140 | A1 | 6/2021 | Jasny et al. | |
| 2021/0179254 | A1 * | 6/2021 | Scotford | B64C 1/1438 |
| 2021/0237880 | A1 * | 8/2021 | Gaston | B64D 11/0606 |

FOREIGN PATENT DOCUMENTS

| | | | | | |
|---|---|---|---|---|---|
| DE | 10 2018 126 680 | A1 | | 4/2020 | |
| EP | 1 134 338 | A2 | | 9/2001 | |
| EP | 3225548 | A1 | * | 10/2017 | B64C 1/1423 |
| EP | 3290328 | A1 | * | 3/2018 | B64D 45/0029 |
| EP | 3643615 | A1 | * | 4/2020 | B64D 11/0606 |
| GB | 2555123 | B | * | 4/2020 | B60N 2/91 |
| WO | 2017/066559 | A1 | | 4/2017 | |
| WO | 2020/020658 | A1 | | 1/2020 | |

OTHER PUBLICATIONS

International Preliminary Report on Patentablility of the International Searching Authority mailed May 18, 2022 in corresponding international application No. PCT/EP2021/063027 (English Translation Only).
International Search Report of the International Searching Authority mailed Aug. 24, 2021 in corresponding International application No. PCT/EP2021/063027 (English Translation Only).
Office Action dated Jan. 21, 2025 issued for the corresponding Chinese Patent Application 202180055959.3 (and English summary).

* cited by examiner

AIRCRAFT SEAT MODULE

CROSS REFERENCE TO RELATED APPLICATIONS

This application is a U.S. national stage application of PCT/EP2021/063027 filed on May 17, 2021, which claims priority from and incorporates herein by reference the German patent application DE 10 2020 115 567.0 filed on Jun. 12, 2020.

PRIOR ART

The invention relates to an aircraft seat module.

In the document WO 2020/020658 A1 an aircraft seat module having an enclosure unit which at least partially delimits a flight passenger seating area, and having a door unit which at least in one operating state is configured at least to close a passage region to the flight passenger seating area, having a bearing device which is configured to support the door unit so as to be movable between an open position and a closed position in relation to the enclosure unit, and having a locking device which is configured to lock the door unit in the completely open position and for this purpose has an electrically and/or electronically actuatable actuator device, which is at least configured to be electrically and/or electronically actuated for an unlocking of the door unit, has already been proposed.

The object of the invention lies in particular in providing a module of the generic type, which has improved properties in terms of safety and comfort. The object is achieved according to the invention.

Advantages of the Invention

The invention proceeds from an aircraft seat module having an enclosure unit which at least partially delimits a flight passenger seating area, and having a door unit which at least in an operating state is at least configured to close a passage region to the flight passenger seating area, having a bearing device which is configured to support the door unit so as to be movable between an open position and a closed position in relation to the enclosure unit, and having a locking device which is configured to lock the door unit in the completely open position and for this purpose has an electrically and/or electronically actuatable actuator device, which is at least configured to be electrically and/or electronically actuated for an unlocking of the door unit.

It is proposed that the actuator device comprises an actuator, a first locking element and a second locking element, wherein the two locking elements can be adjusted from their locking position to their unlocking position by an activation of the actuator. The term "aircraft seat module" is preferably understood to be a module which defines a flight passenger seating area and to this end comprises at least one enclosure element which at least partially separates the flight passenger seating area from a remaining cabin area, at least one aircraft seat disposed in the flight passenger seating area, and further elements of the flight passenger seating area such as, in particular, a console, an ottoman and/or a screen unit. The aircraft seat is preferably realized as a single seat or as a double seat. A "flight passenger seating area" is preferably understood to be an area in which an aircraft seat, preferably an aircraft seat realized as a single seat, or a seat unit formed from two aircraft seats, is disposed and which is configured to accommodate at least one passenger during a flight in an aircraft. Further elements which can be utilized by a passenger, such as, in particular, a console, an ottoman, stowage possibilities, storage elements and/or entertainment devices, are preferably disposed in a flight passenger seating area. The flight passenger seating area is implemented as a sub-area of a cabin, preferably of an aircraft cabin. A flight passenger seating area is preferably contiguous to at least one aisle region of the cabin. A "contiguous cabin area" is preferably understood to be an area of the cabin which is directly contiguous to the flight passenger seating area, such as preferably an aisle region by way of which the flight passenger seating area can be reached by a passenger. A "door unit" is preferably understood to be a functional group which in at least one operating state is configured to at least partially separate the at least one flight passenger seating area from the remainder of the cabin, preferably from at least one aisle region of the cabin. The door unit, in at least one operating state, preferably separates the at least one flight passenger seating area at least partially physically, in particular such that a passage is blocked, and at least partially visually, in particular so as to at least partially block the view and preferably so as to completely block the view, from the remainder of the cabin, in particular up to a height of the at least one enclosure element. The door unit is adjustable at least between an open position and a closed position. The door unit can preferably additionally be held in at least one intermediate position between the open state and the closed state. The door unit is preferably formed from a solid material such as, in particular, a plastics material, for example a fiber-reinforced plastics material, a composite material (composite board) such as, for example, a sandwich material with a honeycomb core, a metal such as, in particular, aluminum, or by a frame, for example an aluminum frame with a cover from a textile or leather material. A door unit can preferably also be realized as a simple dividing element such as, for example, a privacy divider. A "passage region" is in particular understood to be an area which is disposed between the flight passenger seating area and the aisle region of the cabin and by way of which the two areas are connected to one another. A person, in particular a passenger, can move between the flight passenger seating area and the aisle region of the cabin by way of the passage region. A "bearing device" is in particular understood to be a device which is configured to support a component such as, preferably, the door unit, so as to be movable between at least two positions. The bearing device is preferably particularly configured to support the door unit so as to be movable between a maximally closed position and a maximally open position. The bearing device is preferably configured to support the door unit so as to be movable along a movement path, wherein the movement path is preferably formed by a straight movement axis. The door unit, by means of the bearing device, is axially adjustable, preferably displaceable, along the movement path, between the open position and the closed position. A "completely open position" is preferably understood to be a position of the door unit in which the door unit is preferably moved completely out of the passage region and as a result completely releases the passage region. The door unit in the completely open position is preferably disposed so as to completely overlap the enclosure unit. The door unit in the completely open position, when viewed from an aisle region, is disposed so as to be completely behind the enclosure unit. In principle, it is conceivable that the door unit in the completely open position is disposed in an interior space of the enclosure unit configured for this purpose. A "closed position" is preferably understood to be a position of the door unit in which the door unit completely closes the passage region. The door unit in the closed position preferably extends across the entire distance between those enclosure elements of the enclosure unit that form the passage region. A "locking device" is preferably understood to be a device which is configured to lock in a positionally fixed manner an element such as, preferably, the door unit in at least one position, preferably in the completely open position, thus to establish this position in a positionally fixed manner. The locking device is preferably configured to lock the door unit in a form-fitting and/or force-fitting manner. The locking device preferably has at least one, particularly preferably two, locking element(s). A locking element, in a locking position of the locking device, is preferably configured to engage in a form-fitting manner in a mating part of equivalent implementation. The locking element in the locking position of the locking device is preferably disposed in a locking position. In an unlocking position of the locking device, the locking element is preferably disposed in an unlocking position in which the locking element does not block the locking position. The locking element in the unlocking position preferably does not contact in a form-fitting manner the corresponding mating part in which the locking element engages for locking the locking device in a form-fitting manner. A "locking position of the locking device" is understood to be a position of the locking device in which the door unit is able to be locked in a positionally fixed manner. In the locking position of the locking device, a locking element is preferably disposed in a locking position in which the locking element is configured to engage in the mating part of equivalent implementation. The subject matter to be locked, in particular the subject matter of the door unit, is preferably only in one defined position, preferably the closed position. In principle, it is conceivable that the door unit is not locked when the locking device is in the locking position of the latter, specifically when the door unit is not disposed in the closed position thereof. An "unlocking position of the locking device" is preferably understood to be a position of the locking device in which the locking position is configured to release a movement of the door unit and not to block the latter. The door unit in the unlocking position is released and can be moved from the open position to the closed position. The door unit in the unlocking position of the locking device can preferably be adjusted between the open position and the closed position. An "electrically and/or electronically actuatable actuator device" is in particular understood to be a device which has an electrical or electronically actuatable actuator, the latter in the event of electrical and/or electronic actuation changing an operating state, such as carrying out, for example, a movement, preferably an axial movement, and/or generating a magnetic field. "Configured" is preferably to mean specifically programmed, designed and/or equipped. An object being configured for a specific function is in particular to mean that the object fulfils and/or carries out this specific function in at least one state of application and/or operation. As a result of an implementation according to the invention, an aircraft seat module of which the door unit can be unlocked by a passenger in a particularly simple manner can advantageously be provided, and there is advantageously the possibility to prevent in a centrally controlled manner an unlocking of door units of a plurality of aircraft seat modules so as to prevent closing of the door units in specific operating situations such as, for example, during boarding or takeoff and landing phases. Passenger safety and comfort can be advantageously enhanced as a result.

It is furthermore proposed that the locking device has at least one actuation switch which is configured to be activated by a movement of the door unit, the actuator device being actuatable by the activation of said actuation switch. An "actuation switch" is preferably understood to be a switching element which can be switched at least between two operating states, preferably an activated state and a deactivated state. The actuation switch is preferably embodied as a push button. It is preferably likewise conceivable that the actuation switch is formed in another way which is considered expedient by the person skilled in the art, for example as a toggle switch or as a simple switching element which in an activated state closes a current circuit. A "movement of the door unit" is preferably understood to be a movement of the door unit along the movement path thereof, between the opened and the closed position of the door unit. The actuation switch is preferably activated by a movement of the door unit in an opening direction. The actuation switch is preferably activated by a movement of the door unit in the opening direction from the closed position. The door unit can thus be decoupled from the open position by a movement counter to the closing movement. "Activated by a movement of the door unit" is preferably understood to mean that the actuation switch is automatically activated, thus switched from one of the operating states thereof to another, during a specific movement of the door unit. During a defined movement of the door unit, the actuation switch is preferably activated, thus physically contacted, by the door unit per se, or a coupling element connected to the door unit. A particularly advantageously simple activation of the actuation switch, and thus unlocking of the door unit, can be achieved as a result.

It is furthermore proposed that the actuation switch is activatable by a movement of the door unit in an opening direction of the door unit. An "opening direction" is preferably understood to be a movement of the door unit along the movement path in which the door unit, preferably from the closed position, is moved for displacement to the open position. A "closing direction" is preferably understood to be a movement of the door unit along the movement path in which the door unit, preferably from the open position, is moved for displacement to the closed position. In principle, it is conceivable in particular that a movement of the door unit in the closing direction is assisted by a spring force. As a result, the movement for activating the actuation switch can be realized in a particularly advantageous manner.

It is furthermore proposed that the locking device in a non-energized state of the electrically and/or electronically actuatable actuator device is configured to assume the locking position. A "non-energized state" is preferably understood to be a state in which the actuator device is not impinged with a current. As a result, locking of the door unit can preferably advantageously also be guaranteed in the event of a failure of the current supply or of a defect of the actuator device.

It is furthermore proposed that the locking device in a non-energized state of the actuator device is configured to lock the door unit in the open position. As a result, the door unit can be advantageously locked in the open position in the event of a current failure.

It is furthermore proposed that the door unit in a non-energized state of the actuator device is configured to be brought into its open position and to be locked in the the open position. As a result, the door unit in a manner advantageously independent of a position of the locking elements of a current supply of the actuator device can always be brought into an open position, safety being able to be advantageously increased as a result.

It is moreover proposed that the locking device has a movably supported, spring-loaded locking element which can be actively set to an unlocking position by the actuator device. The locking device can be implemented in a particularly advantageous manner as a result.

It is furthermore proposed that the locking device has a form-fit element which is implemented as a recess and is realized so as to correspond to the locking element, the locking element for locking the door unit engaging in said form-fit element. The form-fit element that is implemented as a recess is preferably disposed in a locking base body that is attached to the door unit. The locking base body is configured to be fixedly attached to the door unit. The form-fit element formed by the recess implements the mating part for the locking element of the locking device. As a result, the locking device can be realized in a particularly advantageous and simple manner such that an activation of the actuator device is possible by moving the door unit.

It is moreover proposed that the actuator device is configured to be deactivated in a centrally controlled manner so as to in at least one operating state prevent an inunlocking of the door unit. "Deactivated" is preferably understood to mean that energizing the actuator of the actuator device, preferably by a passenger, is no longer possible. In a deactivated state of the actuator device, adjusting the actuator element of the actuator device from a deactivated state to an activated state by activating the actuation switch is preferably not possible. As a result, door units of a plurality of aircraft seat modules in an arrangement in an aircraft can be conjointly locked in an open position.

It is furthermore proposed that the aircraft seat module has a sensor unit which is at least configured to detect the door unit in the open position. A "sensor unit" in this context is preferably understood to be a unit which is configured to record at least one parameter and/or a physical property, wherein the recording can take place actively such as, in particular, by generating and emitting an electric measuring signal, and/or passively such as, in particular, by detecting variations in the property of a sensor component. Various sensor units that are considered expedient by the person skilled in the art are conceivable. A sensor unit is preferably configured to emit an electric and/or electronic sensor signal which can preferably be evaluated by a corresponding computer unit. As a result, it can be identified in an advantageously simple manner if the door unit is disposed in the open position, as a result of which a functional reliability can be enhanced in particular.

It is furthermore proposed that the locking device has a locking state indication unit which at least in the maximally open position of the door unit is configured to detect and indicate an incomplete locking of at least one of the two locking elements. A "locking state indication unit" is preferably understood to be a unit which detects a state of locking of the locking elements, in particular incomplete locking of the locking elements of the locking device, and emits a corresponding optical, acoustic, optical and/or electronic signal by way of which a corresponding state, in particular incomplete locking of the locking element, is indicated, i.e. displayed. The locking state indication unit is preferably configured to indicate if one of the two locking elements is incompletely locked and the door unit as a result is indeed partially locked but not locked in an orderly manner by both locking elements. "Incomplete locking of a locking element" is in particular understood to be a state in which the locking element does not completely engage in a form-fitting manner in a corresponding mating part, as is intended for the locking position. In the event of incomplete locking of a locking element, the locking element does not engage in a form-fitting manner in the mating part that is configured for this purpose. In the event of incomplete locking of a locking element, the locking element cannot hold the door unit in the locking position. "Configured" is in particular to mean specifically designed and/or equipped. That an object is configured for a specific function is in particular to mean that the object fulfils and/or carries out this specific function in at least one state of application and/or operation. Incorrect locking of the door unit can be determined and indicated in an advantageously simple manner by a design embodiment according to the invention. As a result of the design embodiment of the invention, it can be identified and indicated in particular if one of at least two locking elements is not correctly locked. As a result, an incorrectly locked door unit can be easily pointed out to a crew member or a passenger, for example. As a result, dangerous situations as a result of incorrectly locked door units can preferably be avoided if it can be identified by a check which is easy to carry out, for example prior to the aircraft landing, whether a door unit is correctly locked. A safety aspect of the aircraft seat device can be enhanced in particular in an advantageous manner as a result. As a result, the indication unit can advantageously be disposed independently of the locking elements and, in a particularly advantageous manner, in an area which can readily be seen by a person.

It is furthermore proposed that the locking state indication unit in the event of incomplete locking of one of the locking elements is configured to permit a displacement of the locked door unit by an indication length in the closing direction. An "indication length" is preferably understood to be a defined length by way of which the door unit can be displaced in the closing direction so that incomplete locking can be identified. The indication length is preferably less than 30 mm, preferably below 20 mm, and in a particularly preferred design embodiment less than 10 mm. If the indication length is detected purely electronically, for example by a sensor device, an indication length of below 10 mm, for example 5 mm, is conceivable. If the indication length is detected directly and purely optically by a person, the indication length is preferably 25 mm (1 inch). Incomplete locking can be particularly easily identified as a result.

It is furthermore proposed that the locking state indication unit has an indication unit which indicates incomplete locking of one of the two locking elements, is disposed separately from the locking elements and preferably disposed in an upper region of the door unit. An "indication unit" is preferably understood to be a unit which can emit an optical, acoustic and/or haptic signal which can be detected by a person, for example by a crew member.

Moreover proposed is a system of at least two aircraft seat modules, wherein the system has a central control unit which in at least one operating state is configured to deactivate in a centrally controlled manner actuator devices of several, preferably of all, aircraft seat modules. A particularly advantageous arrangement of aircraft seat modules in an aircraft can be provided as a result.

The aircraft seat module according to the invention here is not to be limited to the application and embodiment described above. In particular, the aircraft seat module according to the invention, for fulfilling a functional mode described herein, can have a number of individual elements, components and units which deviates from a number mentioned herein.

DRAWINGS

Further advantages are derived from the following description of the drawings. Three exemplary embodiments of the invention are illustrated in the drawings. The drawings, the description and the claims contain numerous features in combination. The person skilled in the art will expediently also consider the features individually and combine the latter so as to form expedient further combinations.

DESCRIPTION OF THE EXEMPLARY EMBODIMENTS

Figure 1:
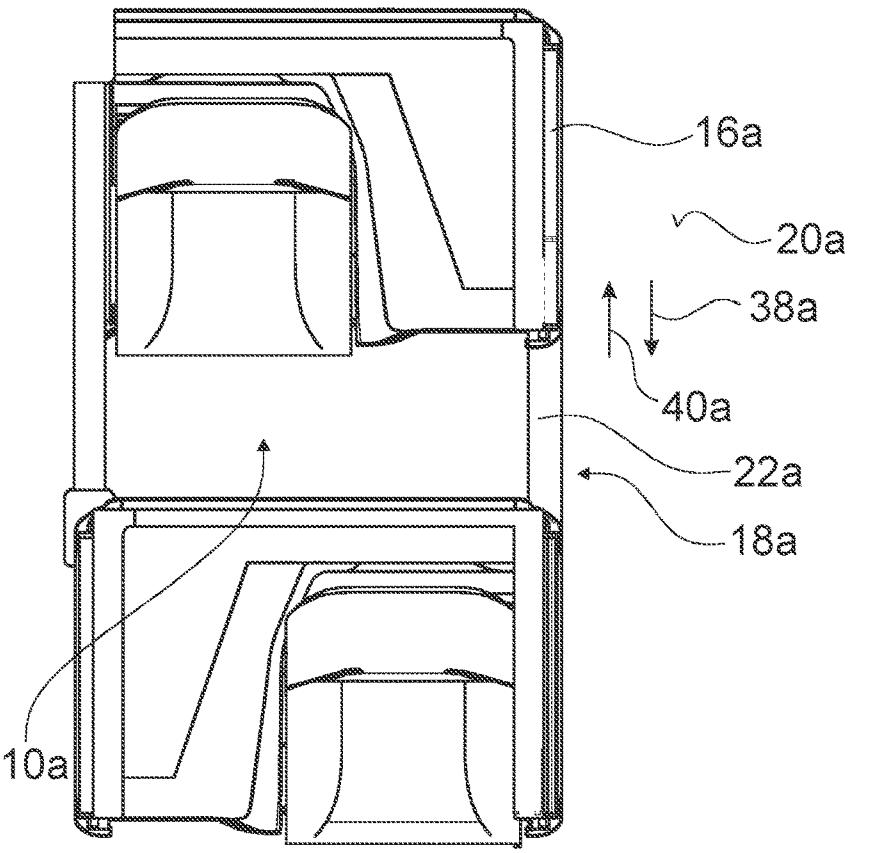
FIG. 1 shows a schematic view of an aircraft seat module in a first exemplary embodiment, having an enclosure unit and a door unit.
Figure 2:
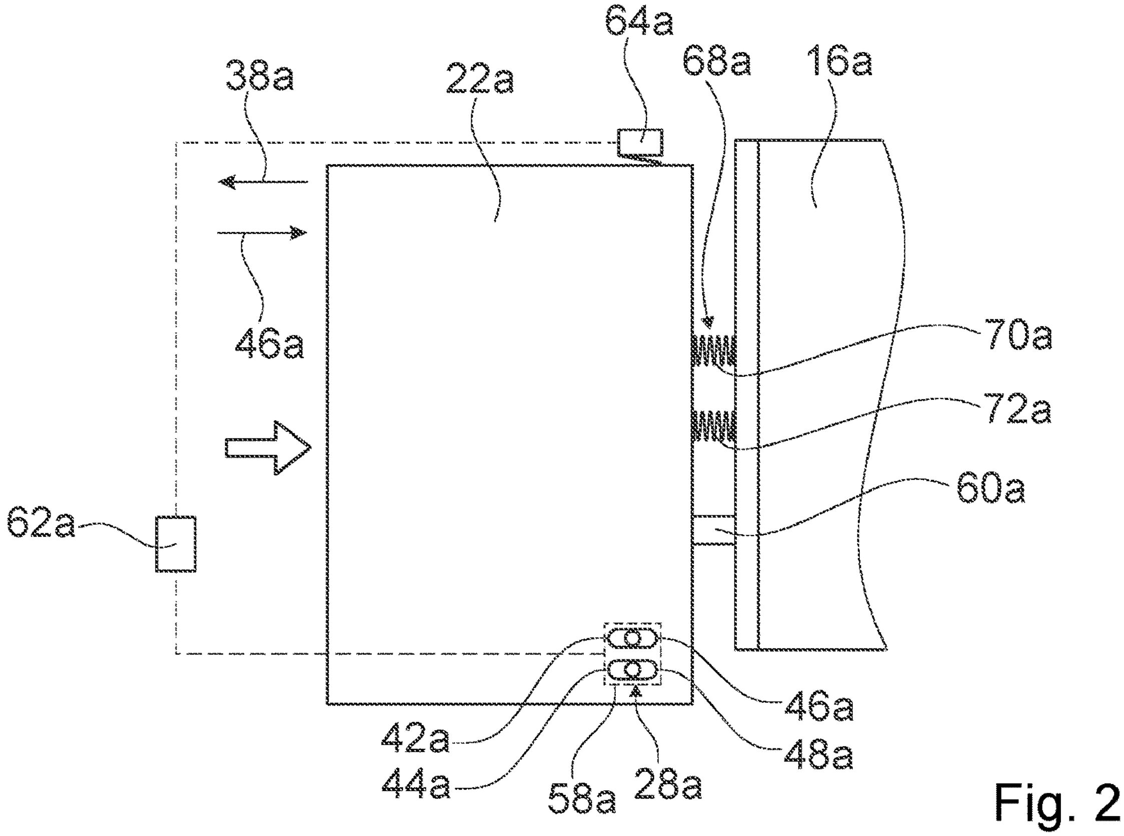
FIG. 2 shows a schematic view of a door unit having a locking device.
Figure 3:
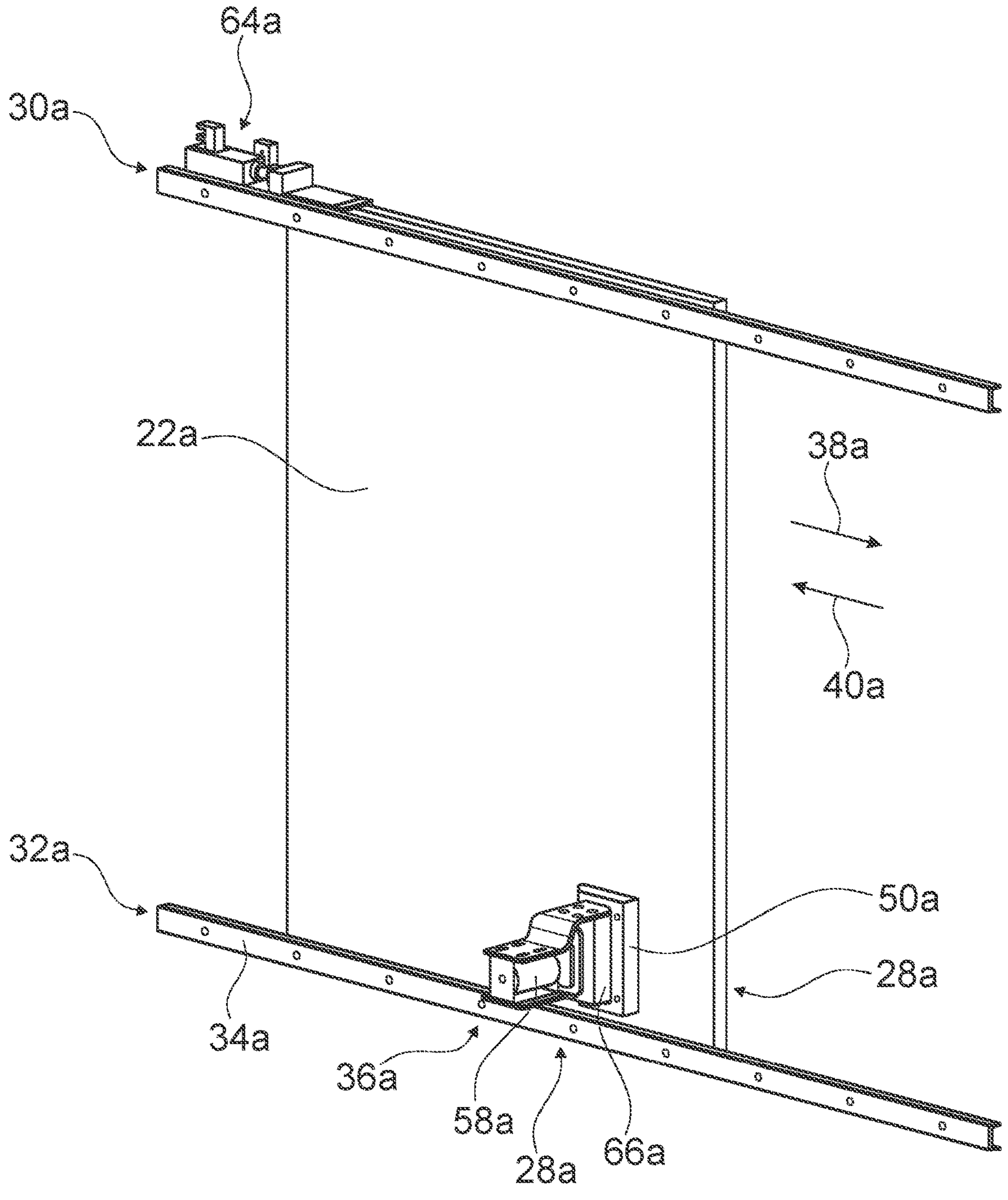
FIG. 3 shows a further, more detailed door unit having a locking device.
Figure 4:
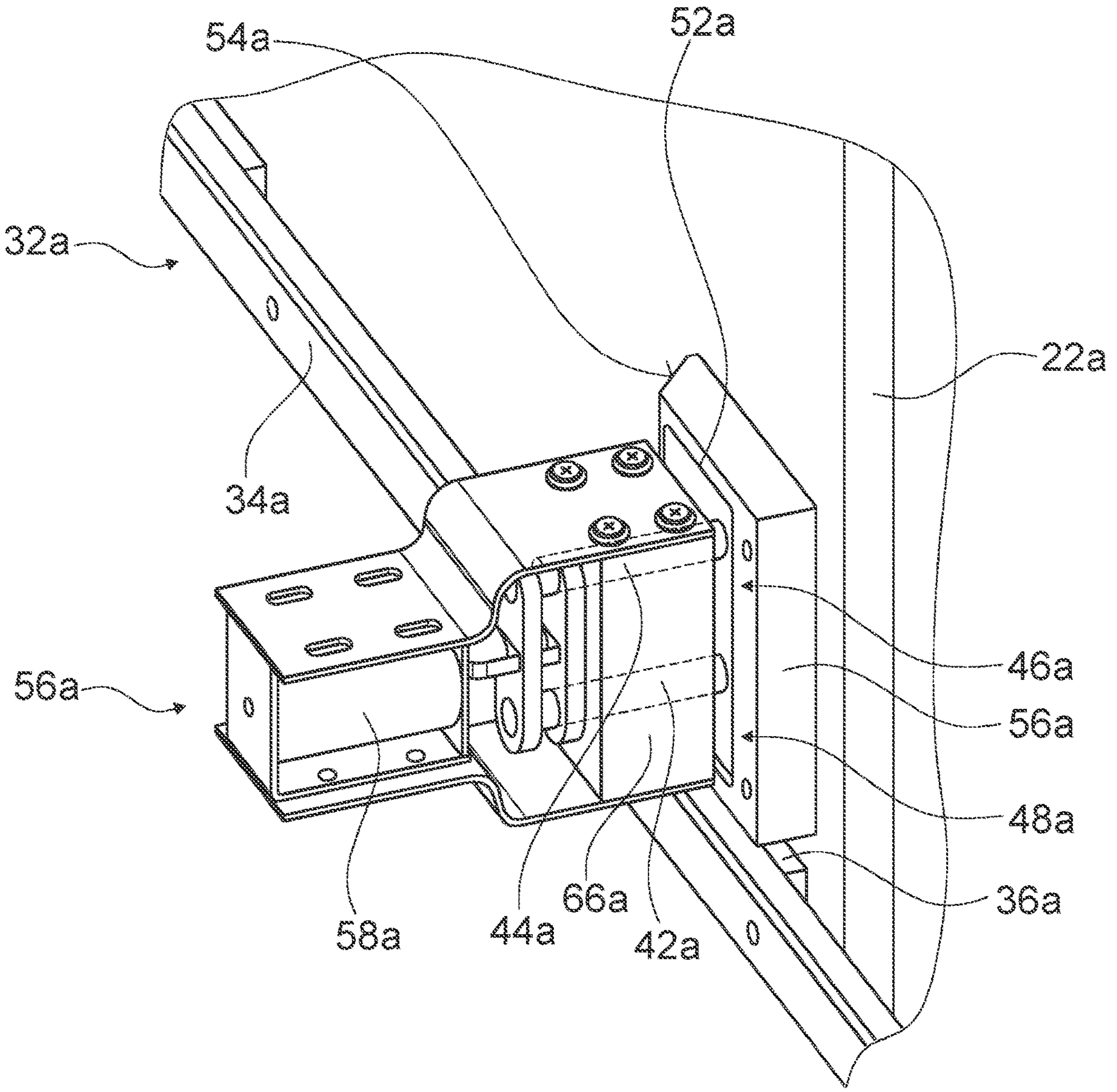
FIG. 4 shows a schematic view of the locking device having an actuator device.
Figure 5:
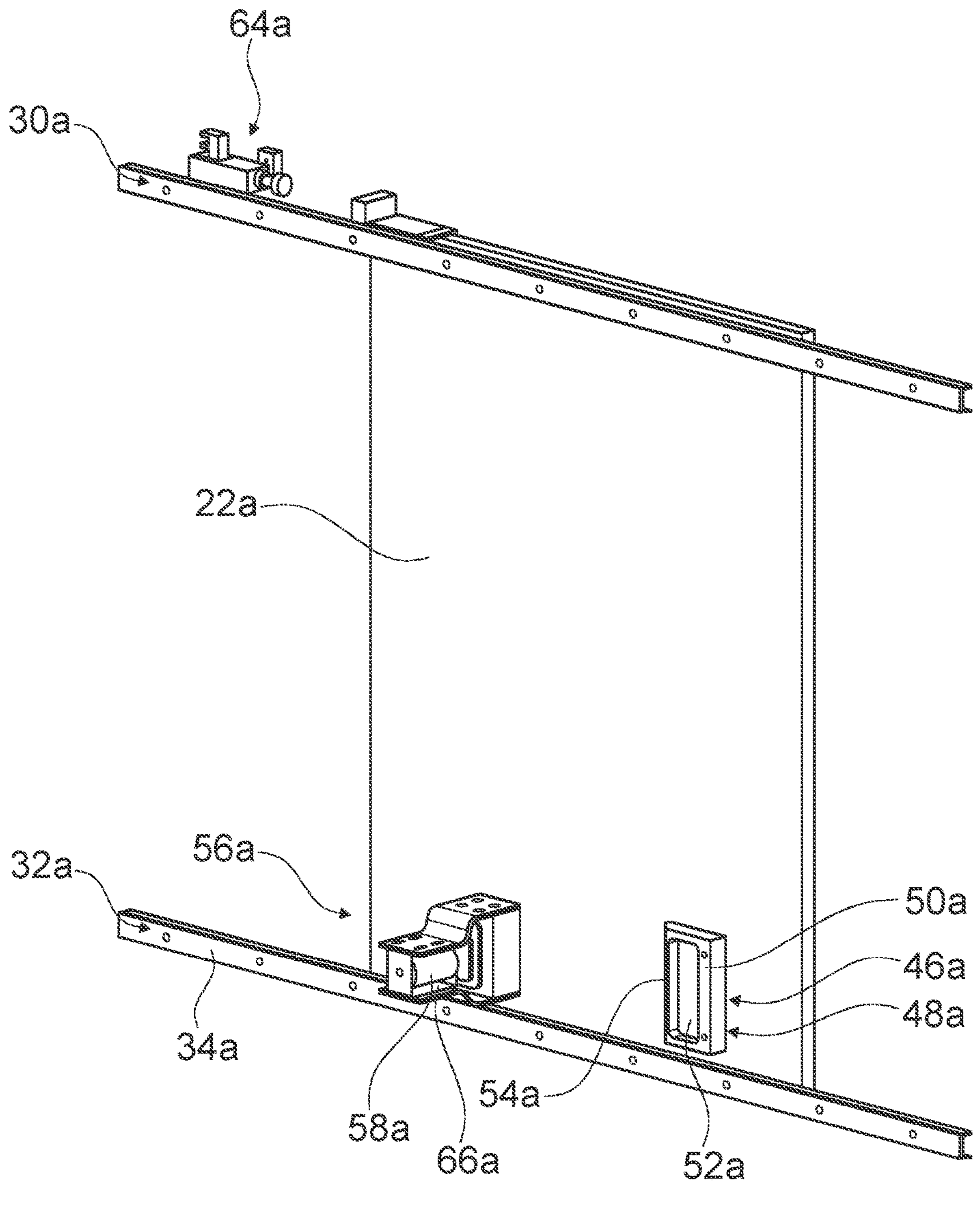
FIG. 5 shows a schematic illustration of the door unit in a partially closed state, having a locking device.
Figure 6:
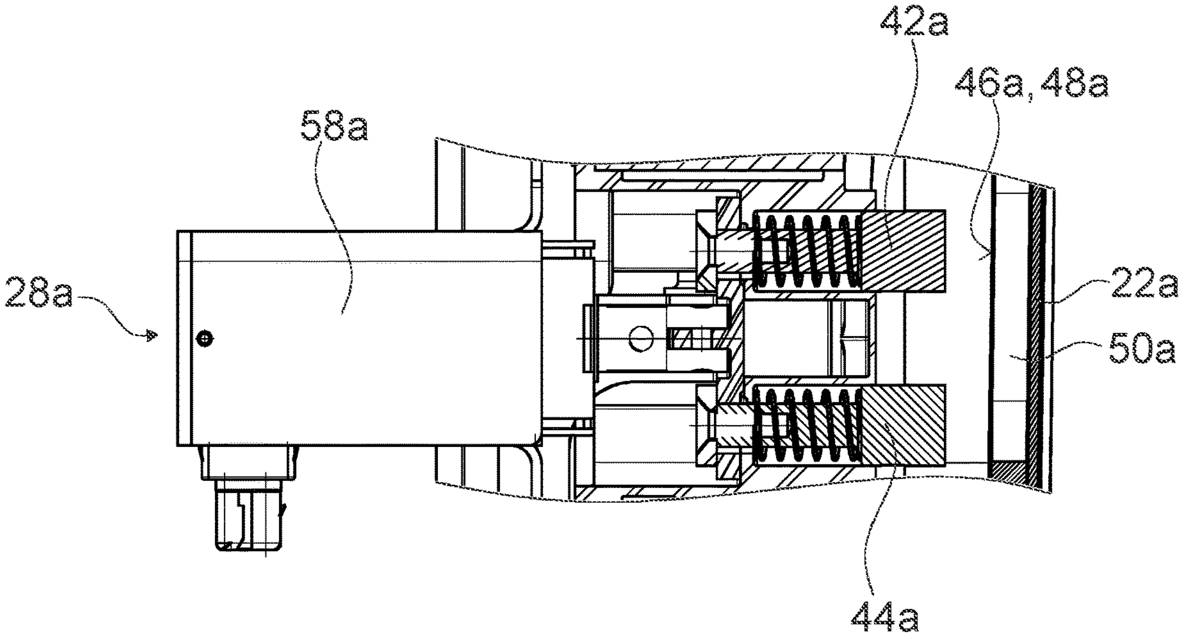
FIG. 6 shows a schematic sectional view of the locking device having an actuator device.

An aircraft seat module is shown in FIGS. 1 to 6. The aircraft seat module is implemented as part of an interior design of an aircraft cabin. A plurality of aircraft seat modules are preferably disposed in an aircraft cabin. The aircraft seat module implements a flight passenger seating area 10*a*. The flight passenger seating area 10*a* is realized as an area which is in particular available to a passenger during a flight. The flight passenger seating area 10*a* is preferably realized in particular as a business class or first class flight passenger seating area. The aircraft cabin has at least one aisle region 20*a*. The flight passenger seating area 10*a* is able to be reached, in particular by a passenger, by way of the aisle region 20*a*. The aircraft seat module comprises an aircraft seat 12*a* which is disposed in the flight passenger seating area 10*a*. The aircraft seat 12*a* is preferably implemented in particular as an aircraft seat 12*a* which is adjustable from at least one sitting position to a reclined position. The aircraft seat module has an enclosure unit 14*a*. The enclosure unit 14*a* is configured to at least partially separate the flight passenger seating area 10*a* from a remainder of the aircraft cabin. The enclosure unit 14*a* is configured to at least substantially surround the flight passenger seating area 10*a*. The enclosure unit 14*a* is configured in particular to spatially separate the flight passenger seating area 10*a* from a remainder of the aircraft cabin, in particular a cabin aisle, so as to achieve in particular enhanced privacy for a passenger in the flight passenger seating area 10*a*. The enclosure unit 14*a* preferably extends up to a height of 1.30 m. A height here corresponds to the predefined air transport standards which may by all means also change. The height is preferably measured proceeding from a cabin floor. In principle, the door unit 22*a* does not have to extend to the cabin floor; it is also conceivable for the door unit 22*a* to begin only at a height of a reclining surface of the aircraft seat 12*a*. In principle, it is also conceivable that the enclosure unit 14*a* in sub-areas extends up to another height and/or else up to a cabin ceiling of the aircraft cabin. The enclosure unit 14*a* here may also have different heights in different sub-areas. The enclosure unit 14*a* has an enclosure element 16*a*. The enclosure element 16*a* at least partially surrounds the flight passenger seating area 10*a*. In principle, the enclosure element 16*a* can separate the flight passenger seating area 10*a* solely or conjointly with an enclosure unit 14*a* of another aircraft seat module. The enclosure element 16*a* is preferably formed from a composite material. In principle, it is also conceivable that the enclosure element 16*a* is formed from another material which is considered expedient by the person skilled in the art. In principle, it is also conceivable that the enclosure unit 14*a* has a plurality of enclosure elements 16*a*. The enclosure unit 14*a* forms a passage region 18*a*. The passage region 18*a* connects the flight passenger seating area 10*a* and the contiguous aisle region 20*a* of the aircraft cabin. A person, in particular a passenger, can make their way through the passage region 18*a* from the aisle region 20*a* into the flight passenger seating area 10*a*, and vice versa. No enclosure element 16*a* is preferably disposed in the passage region 18*a*. The passage region 18*a* preferably has a width of 38 cm.

The aircraft module comprises a door unit 22*a*. The door unit 22*a* at least in one operating state is configured to at least partially separate the flight passenger seating area 10*a* from a contiguous cabin area, in particular the aisle region 20*a*. The door unit 22*a* is configured to lock the passage region 18*a* in a closed position. The door unit 22*a*, in the fully closed position, completely blocks the passage region 18*a*. It is conceivable in particular here that a gap remains in particular in a lower region between the door unit 22*a* and the cabin floor. The door unit 22*a* in the fully closed position, at least in a sub-area, extends completely between the enclosure element 16*a* and a further enclosure element 26*a*, the latter two delimiting the passage region 18*a*. The further enclosure element 26*a* can in particular be an enclosure element of a further enclosure unit that is disposed in front of the enclosure unit 14*a* and encloses a further aircraft seat. The door unit 22*a* in an open position is configured to release the passage region 18*a*. The door unit 22*a* in the open position is preferably completely moved out of the passage region 18*a*. The door unit 22*a* is attached to the enclosure unit 14*a*, in particular to the enclosure element 16*a*. In principle, it would likewise be conceivable that the door unit 22*a* is attached to the further enclosure element 26*a* of the front enclosure unit.

The aircraft seat module for supporting the door unit 22*a* has a bearing device 24*a*. The bearing device 24*a* is configured to support the door unit 22*a* so as to be movable on the enclosure unit 14*a*. The door unit 22*a* by way of the bearing device 24*a* is attached to the enclosure element 16*a*. The door unit 22*a* by means of the bearing device 24*a* is adjustable between the open position and the closed position. The bearing device 24*a* is preferably embodied as a linear bearing device. The door unit 22*a* by means of the bearing device 24*a* that is embodied as a linear bearing device is linearly displaceable between a closed position and an open position.

The door unit 22*a* by means of the bearing device 24*a* is movable in a closing direction 38*a* and in an opening direction 40*a*. The closing direction 38*a* and the opening direction 40*a* are mutually opposite directions of the movement path along which the door unit 22*a* is displaceable by means of the bearing device 24*a*. The closing direction 38*a*, proceeding from the open position of the door unit 22*a*, is aligned so as to be parallel to the movement path in the direction of the closed position. The closing direction 38*a* is directed so as to be parallel to the movement path away from the enclosure element 16*a*. The opening direction 40*a*, from the closed position of the door unit 22*a*, is aligned so as to be parallel to the movement path in the direction of the open position of the door unit 22*a*. The opening direction 40*a* is aligned so as to be parallel to the movement path in the direction of the enclosure element 16*a*.

The bearing device 24*a* preferably comprises two bearing modules 30*a*, 32*a*. The bearing device 24*a* has the first bearing module 30*a* and the second bearing module 32*a*. The first bearing module 30*a* is configured to support the door unit 22*a* in an upper region. The first bearing module 30*a* is in particular disposed in an upper region of the door unit 22*a*. The second bearing module 32*a* is configured to support the door unit 22*a* in a lower region. The second bearing module 32*a* is disposed in a lower region of the door unit 22*a*. Particularly uniform support of the door unit 22*a* can be achieved by the two bearing modules 30*a*, 32*a* which are disposed on two mutually opposite regions of the door unit 22*a*. The bearing modules 30*a*, 32*a* preferably have in each case one first bearing element 34*a*, embodied as a linear bearing rail, and disposed so as to be supported in an axially displaceable manner therein a second bearing element 36*a*. For example, it is conceivable that the first bearing element 34*a*, embodied as a linear bearing rail, is fixedly connected to the enclosure unit 14*a*, and that the second bearing element 36*a* is fixedly connected to the door unit 22*a*. In principle, it is also conceivable that the two bearing elements 34*a*, 36*a* are in each case attached so as to be exactly vice versa.

The aircraft module comprises a locking device 28*a*. The locking device 28*a* is configured to lock the door unit 22*a* in the open position. The open position, in which the locking device 28*a* can lock the door unit 22*a*, is preferably understood to be a completely closed position. An open position and a completely open position are preferably identical. As opposed to the open position, there is a partially open position and the closed position of the door unit 22*a*. The locking device 28*a* is configured to lock the door unit 22*a* in a locking position, and in an unlocking position to release a movement of the door unit 22*a* along the movement path of the door unit 22*a*. As a result of the door unit 22*a* being locked in the open position, the door unit 22*a* is advantageously secured and the passage region 18*a* is released.

The locking device 28*a* comprises an electrically and/or electronically actuatable actuator device 56*a*. The actuator device 56*a* comprises a first locking element 42*a*. The actuator device 56*a* comprises a second locking element 44*a*. A redundancy can advantageously be achieved by the second locking element 42*a*, as a result of which the locking device 28*a* still remains operational even in the event of a failure of one of the locking elements 42*a*, 44*a*. In principle, it would also be conceivable that the actuator device 56*a* comprises only one locking element 42*a*, 44*a*, or has more than two of the locking elements 42*a*, 44*a* as will be described hereunder. The locking elements 42*a*, 44*a* are embodied as locking pins. The locking elements 42*a*, 44*a*, embodied as locking pins, preferably have a circular cross section. In principle, it would also be conceivable that the locking elements 42*a*, 44*a* have an oval or rectangular cross section. The locking elements 42*a*, 44*a* are of a substantially identical implementation. The locking elements 42*a*, 44*a* are adjustable between a locking position and an unlocking position. The actuator device 56*a* has a base body 66*a*. The locking elements 42*a*, 44*a* are supported so as to be movable in the base body 66*a*. The locking elements 42*a*, 44*a* are supported so as to be axially displaceable in the base body 66*a*. The locking elements 42*a*, 44*a* for adjustment between the locking position and the unlocking position are axially displaceable. The locking elements 42*a*, 44*a* are preferably implemented so as to be spring-loaded. The actuator device 56*a* for each locking element 42*a*, 44*a* has one spring element which subjects in each case the locking elements 42*a*, 44*a* to a spring force in one direction. In principle, it would also be conceivable that the actuator device 56*a* has a common spring element for both locking elements 42*a*, 44*a*. The locking elements 42*a*, 44*a* are impinged with the spring force in the direction of the locking position of said locking elements 42*a*, 44*a*. The locking elements 42*a*, 44*a* by means of the spring elements are implemented such that their locking position realizes a neutral position into which the locking elements 42*a*, 44*a* are automatically adjusted. The two locking elements 42*a*, 44*a* are disposed next to one another. The locking elements 42*a*, 44*a* are in each case supported so as to be linearly displaceable in a guiding recess. The guiding recesses are preferably disposed in the base body 66*a* of the actuator device 56*a*. The locking elements for locking the door unit 22*a* in the locking position are configured to engage in a form-fitting manner in a mating part.

The locking device 28*a* for each locking element 42*a*, 44*a* comprises one form-fit element 46*a*, 48*a* in which the corresponding locking element 42*a*, 44*a* engages in a form-fitting manner for locking. The form-fit elements 46*a*, 48*a* are implemented as recesses. The form-fit elements 46*a*, 48*a*, implemented as recesses, have an extent that is larger than the locking elements 42*a*, 44*a* engaging therein. The form-fit elements 46*a*, 48*a*, in particular in the direction of movement of the door unit 22*a*, have an extent that is larger than a corresponding extent of the locking elements 42*a*, 44*a*. As a result, a corresponding locking element 42*a*, 44*a* that engages in the form-fit element 46*a*, 48*a* has a defined freedom of movement in the form-fit element 46*a*, 48*a*. The locking device 28*a* comprises a locking base body 50*a*. The form-fit elements 46*a*, 48*a* are incorporated in the locking base body 50*a*. The form-fit elements 46*a*, 48*a* are incorporated in an upper side of the locking base body 50*a*. The two form-fit elements 46*a*, 48*a* are preferably implemented conjointly. The two form-fit elements 46*a*, 48*a* are realized as a common recess 52*a*. As a result of the form-fit elements 46*a*, 48*a* being implemented conjointly by the common recess 52*a*, the locking base body 50*a* can be of a particularly simple implementation. The locking base body 50*a* is preferably formed from a metal. The locking base body 50*a* is realized as a separate component. The locking base body 50*a*, in an assembly step, is preferably configured to be fixedly assembled on a component of the aircraft seat module, preferably of the door unit 22*a* or of the enclosure unit 14*a*. The locking base body 50*a* in the exemplary embodiment shown is preferably fixedly connected to the door unit 22*a*. The locking base body 50*a* is attached to an inner side of the door unit 22*a*. The locking base body 50*a* is preferably screwed to the door unit 22a. In principle, it is also conceivable that the locking base body 50a is connected to the door unit in another form-fitting manner, or by way of a materially integral connection such as, preferably, an adhesive bond, is fixedly connected to the door unit. In principle, it would likewise be conceivable that the locking base body 50a is implemented integrally with the door unit 22a. The locking base body 50a forms a surface which is elevated in relation to the inner side of the door unit 22a. The form-fit elements 46a, 48a that are incorporated in the upper side of the locking base body 50a have an opening which is elevated in relation to the inner side of the door unit 22a. As a result, a locking element 42a, 44a that is disposed in the locking position thereof can have a spacing from the inner side of the door unit 22a and nevertheless engage in a functionally reliable manner in the corresponding form-fit element 46a, 48a. Dragging of the inner side of the door unit 22a, and thus damage to the latter by the locking elements 46a, 48a, can be advantageously prevented as a result. The locking base body 50a on a first side forms an oblique face 54a. The oblique face 54a is embodied as an oblique activation face which is configured to adjust the locking elements 42a, 44a from the locking position thereof to the unlocking position thereof. When adjusting the door unit 22a to the open position thereof, the oblique face 54a is configured in particular to move the locking elements 42a, 44a, just before reaching the open position, from the locking position thereof to the unlocking position thereof. The locking elements 42a, 44a are configured to slide on the oblique face 54a and, as a result of the oblique positioning, to be pushed into the unlocking position of said locking elements 42a, 44a. The locking elements 42a, 44a by way of the oblique face 54a can be pushed out of the locking position thereof to the unlocking position thereof, preferably counter to a spring force of the spring elements. In principle, it is also conceivable that the locking elements 42a, 44a on the lower end thereof form in each case one oblique face by way of which said locking elements 42a, 44a can be pushed out of the locking position thereof to the unlocking position thereof. It is conceivable here that either the locking elements 42a, 44a exclusively have in each case one oblique face, or that the locking elements 42a, 44a form in each case one oblique face in addition to the oblique face 54a of the locking base body 50a.

The electrically and/or electronically actuatable actuator device 56a is configured to be electrically and/or electronically actuated for unlocking the door unit 22a. The spring-loaded locking elements 42a, 44a are actively adjustable to their unlocking position by the actuator device 56a. The actuator device 56a comprises an actuator 58a. The actuator 58a is embodied as an electromechanical actuator. The actuator 58a is preferably embodied as an electromagnetic actuator. The actuator 58a preferably comprises a solenoid which, by being energized, is configured to generate a magnetic field, the latter being configured to move a ferromagnetic activation element to an activation position. The activation element of the actuator 58a is coupled to the two locking elements 42a, 44a. The two locking elements 42a, 44a can be adjusted by activating the actuator 58a. The two locking elements 42a, 44a, by activating the actuator 58a, can be adjusted from the locking position thereof to the unlocking position thereof. In a non-activated state of the actuator 58a, the activation element of the actuator 58a is disposed in a neutral position. In principle, it is conceivable that the actuator device 56a has two separate actuators 58a which are in each case coupled to one of the locking elements 42a, 44a and adjust the latter. In principle, it is likewise conceivable that the locking elements 42a, 44a and a corresponding activation element of the corresponding actuator 58a are implemented integrally with one another. In principle, it is also conceivable that the actuator 58a is implemented by an electronic servomotor and preferably a gearbox by way of which the locking elements 42a, 44a are adjustable. The electrically and/or electronically actuatable actuator device 56a is attached to the enclosure unit 14a. The electrically and/or electronically actuatable actuator device 56a is preferably attached to the enclosure element 16a. In principle, it is also conceivable that the electrically and/or electronically actuatable actuator device 56a is attached to the door unit 22a, and that the locking base body 50a is attached to the enclosure unit 14a. Section checked by EMC ends here

The locking device 28a comprises an actuation switch 60a. The actuation switch 60a is configured to emit a trigger signal which is configured to actuate the actuator device 56a. The actuation switch 60a is configured to directly or indirectly actuate the actuator device 56a. The actuator device 56a can be activated and thus switched to an activated state by means of the actuation switch 60a. The aircraft seat module preferably has a control apparatus 62a. The control apparatus 62a is preferably realized as an aircraft seat control apparatus. The trigger signal of the actuation switch 60a is preferably evaluated by the control apparatus 62a, and the actuator device 56a is correspondingly actuated. In principle, it would also be conceivable that the trigger signal of the actuation switch 60a directly activates the actuator device 56a. The actuation switch 60a is preferably embodied as a push button. The actuation switch 60a is configured to be activated by the door unit 22a. The actuation switch 60a is configured to be activated by a movement of the door unit 22a in the opening direction 40a. The actuation switch 60a is configured to be activated by a movement of the door unit 22a in the opening direction 40a from the closed position, in which the door unit 22a is locked by means of the locking device 28a. A movement of the door unit 22a in the opening direction 40a from the closed position, while the locking elements 42a, 44a engage in a form-fitting manner in the corresponding form-fit elements 46a, 48a, is possible as a result of the form-fit elements 46a, 48a being implemented as a recess, the latter having a larger extent than the locking elements 42a, 44a. The actuation switch 60a is disposed on the enclosure unit 14a. The actuation switch 60a is preferably disposed in an interior space of the enclosure unit 14a in which the door unit 22a is stowed in the open position. In principle, it would also be conceivable that the actuation switch 60a is disposed on the door unit 22a per se. In principle, it is likewise conceivable that the locking device 28a has a further actuation switch which is configured to be manually activated directly by a passenger, and to this end is disposed in the flight passenger seating area 10a at a position readily accessible for the passenger.

The aircraft seat module comprises a sensor device 64a which is configured at least for detecting the door unit 22a in the open position. The sensor device 64a is configured to identify if the door unit 22a is disposed in the open position thereof and is correspondingly able to be locked by the locking device 28a. The sensor device 64a can preferably also be embodied here as a feeler element which in the open position of the door unit 22a is activated by a corresponding detent. In principle, it is also conceivable that the sensor device 64a is realized as a contactless sensor device.

The aircraft seat module comprises a spring device 68a which is configured to subject the door unit 22a to a spring force. The spring device 68a comprises two spring elements 70*a*, 72*a*. In principle, only one spring element 70*a*, 72*a* is also conceivable. The spring device 68*a* in functional terms is disposed between the door unit 22*a* and the enclosure unit 14*a*. The spring device 68*a* is configured to exert a spring force acting in the closing direction 38*a* on the door unit 22*a*. The spring device 68*a* is configured to exert in an open position of the door unit 22*a* a spring force on the door unit 22*a* so as to assist a closing movement of the door unit 22*a*. In a displacement of the door unit 22*a* in the opening direction 40*a* from the closed position in order for the locking device 28*a* to be unlocked by means of the actuation switch 60*a*, the spring device 68*a* is compressed. As a result, a spring force, by way of which a closing movement of the door unit 22*a* is advantageously assisted, can be advantageously increased by the displacement of the door unit 22*a* in the opening direction 40*a*.

The door unit 22*a* in the open position is preferably locked by the locking device 28*a*. The locking elements 42*a*, 44*a* are disposed in a form-fitting manner in the corresponding form-fit elements 46*a*, 48*a* and thus fix the door unit 22*a* in a form-fitting manner in relation to the enclosure unit 14*a*. The spring device 68*a* pushes the door unit 22*a* in the closing direction 38*a*, and as a result pushes the form-fit elements 46*a*, 48*a* by way of an axial end onto the locking elements 42*a*, 44*a*, the latter being disposed in the former. The electrically and/or electronically actuatable actuator device 56*a* is in a non-energized state, as a result of which the locking device 28*a* assumes the locking position thereof. The locking device 28*a* in the non-energized state of the actuator device 56*a* locks the door unit in the open position. By moving the door unit 22*a* in the opening direction 40*a*, for example by a passenger, the actuation switch 60*a* is activated by means of the door unit 22*a*. The actuation switch 60*a*, as soon as the latter is activated, emits a trigger signal which is evaluated by the control apparatus 62*a*. The control apparatus 62*a* emits a control signal to the actuator device 56*a*, the latter being energized as a result by said control signal. In the energized state of the actuator device 56*a*, the actuator 58*a* is activated as a result of which the latter moves the locking elements 42*a*, 44*a* from the locking position to the unlocking position. If a force that is exerted on the door unit 22*a* by the passenger is canceled, the spring device 68*a* pushes the door unit 22*a* in the closing direction 38*a*. The door unit 22*a* in the process is released from the actuation switch 60*a* and no longer activates the latter. The control apparatus 62*a* is configured to activate, thus energize, the actuator device 56*a* for a defined activation period after the activation of the actuation switch 60*a* ends. The activation period here can preferably be 3 seconds. It is conceivable here that a trigger signal lasts less than one second but an activation period lasts correspondingly longer. The activation period is not a function of a duration of a trigger signal. It can be guaranteed as a result that the door unit 22*a* can be closed in a functionally reliable manner. Once the activation period has expired, the actuator device 56*a* is deactivated again and the locking elements 42*a*, 44*a* are pushed back to the locking position thereof by means of the corresponding spring elements 70*a*, 72*a* of the actuator device 56*a*. In the non-energized state of the actuator device 56*a*, the locking elements 42*a*, 44*a* are automatically brought into the locking position by means of the corresponding spring elements 70*a*, 72*a* of the actuator device 56*a*. If the door unit 22*a* from the closed position is moved in the opening direction 38*a* and opened as a result, the locking elements 42*a*, 44*a* come into contact with the oblique face 54*a* of the locking base body 50*a*. The oblique face 54*a* forms a ramp for the locking elements 42*a*, 44*a* moving along the opening direction 40*a*, and counter to the spring force of the spring elements 70*a*, 72*a* of the actuator device 56*a* pushes said locking elements 42*a*, 44*a* from the locking position thereof to the unlocking position thereof. The locking elements 42*a*, 44*a* when reaching the open position of the door unit 22*a* latch into the corresponding form-fit elements 46*a*, 48*a*. The locking elements 42*a*, 44*a* as a result of the spring force of the spring elements 70*a*, 72*a* of the actuator device 56*a* are pushed in an operationally reliable manner into the form-fit elements 46*a*, 48*a* so as to guarantee a latching action. In this way, the door unit 22*a* is locked in the open position. In a non-energized state of the actuator device 56*a*, the door unit 22*a* can be brought into the open position thereof and locked in the open position. The door unit 22*a* can preferably be brought into the open position and locked therein at any time. The locking elements 42*a*, 44*a* of the locking device 28*a*, for adjusting to the open position and for locking the door unit 22*a* in the open position, do not have to be brought into the unlocking position of said locking elements 42*a*, 44*a* by the actuator device 56*a*. The actuator device 56*a* does not have to be energized in order for the door unit 22*a* to be adjusted to the open position and locked in the latter. The actuator device 56*a* has to be energized only for adjusting the door unit 22*a* from the opened locked position, so as to actively move the locking elements 42*a*, 44*a* of the locking device 28*a* from a form-fitting connection with the corresponding form-fit elements 46*a*, 48*a*.

Proposed according to the invention is preferably a system of a plurality of aircraft seat modules. The system is realized as an arrangement of flight passenger seating areas 10*a* in an aircraft cabin. The plurality of flight passenger seating areas are conjointly disposed in an aircraft cabin. All of the flight passenger seating areas 10*a* preferably have the aircraft seat module according to the invention, which in each case comprises the door unit 22*a* which is capable of being locked in the open position and is locked by the corresponding locking device 28*a* and can be unlocked by means of the electrically or electronically actuatable actuator device 56*a*. The system of the aircraft cabin comprises an electronic control system by means of which the control apparatuses 62*a* of the flight passenger seating areas 10*a* are actuatable. The control system preferably comprises a central control unit. The control system can be realized as a bus system, for example. Items of information and commands can be emitted to the control apparatuses 62*a* of the flight passenger seating areas 10*a* in a centrally controlled manner by means of the control system, for example by an input by a crew member. The actuator devices 56*a* of the locking devices 28*a* of all aircraft seat modules of the system are configured to be deactivated in a centrally controlled manner. As a result of a deactivation of the actuator devices 56*a*, the latter can no longer be activated and/or energized. As a result, the locking elements 44*a*, 42*a* of the corresponding locking devices 28*a* can no longer be actively adjusted from the locking position thereof to the unlocking position thereof. As a result, an unlocking of the door units 22*a* of all aircraft seat modules of the system can be prevented in a centrally controlled manner. As a result, unlocking of the door units 22*a*, during a boarding phase or during a takeoff or landing phase, in which the door units 22*a* must be opened, can advantageously be prevented, for example by a crew member, in a centrally controlled manner.

Two exemplary embodiments of the invention are shown in FIGS. 7 to 13. The descriptions hereunder and the drawings are substantially limited to the points of differentiation between the exemplary embodiments, wherein reference in terms of components with identical designation, in particular with regard to components with identical reference signs, can fundamentally also be made to the drawings and/or to the description of the other exemplary embodiments, in particular of FIGS. 1 to 6. For the purpose of differentiation of the exemplary embodiments, the suffix a is added to the reference signs of the exemplary embodiment in FIGS. 1 to 6. The suffix a is replaced by the suffixes b and c in the exemplary embodiments of FIGS. 7 to 13.

An aircraft seat module is shown in FIGS. 1 to 6. The aircraft seat module is implemented as part of an interior design of an aircraft cabin. The aircraft seat module forms a flight passenger seating area 10*b*. The flight passenger seating area 10*b* is realized so as to be substantially identical to the flight passenger seating area of the first exemplary embodiment and will thus not be described further in more detail here. The aircraft cabin has at least one aisle region 20*b*. The aircraft seat module comprises an aircraft seat 12*b* which is disposed in the flight passenger seating area 10*b*. The aircraft seat module has an enclosure unit 14*b*. The enclosure unit 14*b* has an enclosure element 16*b*. The enclosure element 16*b* at least partially surrounds the flight passenger seating area 10*b*. The enclosure unit 14*b* forms a passage region 18*b*. The passage region 18*b* connects the flight passenger seating area 10*b* and the contiguous aisle region 20*b* of the aircraft cabin.

The aircraft seat module comprises a door unit 22*b*. The door unit 22*b* is configured at least in an operating state to at least partially separate the flight passenger seating area 10*b* from a contiguous cabin area, in particular the aisle region 20*b*. The door unit 22*b* is configured to lock the passage region 18*b* in a closed position. The door unit 22*b* in the fully closed position, at least in a sub-area, extends completely between the enclosure element 16*b* and a further enclosure element 26*b*, the latter two delimiting the passage region 18*b*. The door unit 22*b* in an open position is configured to release the passage region 18*b*.

The aircraft seat module for supporting the door unit 22*b* has a bearing device 24*b*. The bearing device 24*b* is configured to support the door unit 22*b* so as to be movable on the enclosure unit 14*b*. The door unit 22*b* by means of the bearing device 24*b* is movable in a closing direction 38*b* and in an opening direction 40*b*. The closing direction 38*b* and the opening direction 40*b* are mutually opposite directions of the movement path along which the door unit 22*b* is displaceable by means of the bearing device 24*b*.

The bearing device 24*b* preferably comprises two bearing modules 30*b*, 32*b*. The bearing device 24*b* has the first bearing module 30*b* and the second bearing module 32*b*. The bearing modules 30*b*, 32*b* are of a substantially identical implementation as in the first exemplary embodiment.

The aircraft seat module comprises a locking device 28*b*. The locking device 28*b* is configured to lock the door unit 22*b* in the open position. The locking device 28*b* is configured to lock the door unit 22*b* in the maximally open stowage position. The locking device 28*b* is configured to lock the door unit 22*b* in a locking position, and in an unlocking position to release a movement of the door unit 22*b* along the movement path of the door unit 22*b*. As a result of the door unit 22*b* being locked in the open position, the door unit 22*b* is advantageously secured and the passage region 18*b* is released.

The locking device 28*b* comprises an electrically and/or electronically actuatable actuator device 56*b*. The actuator device 56*b* comprises a first locking element 42*b*. The actuator device 56*b* comprises a second locking element 44*b*. The locking elements 42*b*, 44*b* are of a substantially identical implementation as in the first exemplary embodiment which is why said locking elements 42*b*, 44*b* are not to be described again in detail here. An explanation pertaining to the locking elements 42*b*, 44*b* can be derived from the corresponding description of the first exemplary embodiment. The locking elements 42*b*, 44*b* are adjustable between a locking position and an unlocking position. The locking elements 42*b*, 44*b* are linearly displaceable along a movement axis between the locking position thereof and the unlocking position thereof. The actuator device 56*b* has a base body 66*b*. The locking elements 42*b*, 44*b* are supported so as to be movable in the base body 66*b*. The two locking elements 42*b*, 44*b* are disposed next to one another. The locking elements 42*b*, 44*b* are disposed so as to be mutually spaced apart. The locking elements 42*b*, 44*b* are in particular disposed so as to be mutually spaced apart in the closing direction 38*b*, or in the opening direction 40*b*, respectively. The locking elements 42*b*, 44*b* are disposed so as to be spaced apart in parallel to the movement path along which the door unit 22*b* is displaceable by means of the bearing device 24*b*. The locking elements 42*b*, 44*b* are disposed next to one another in a horizontal direction. In principle, it would also be conceivable that the locking elements 42*b*, 44*b* are disposed next to one another in a horizontal direction. The locking elements 42*b*, 44*b* in order to lock the door unit 22*b* are configured to engage in the locking position in a form-fitting manner in a mating part.

The locking device 28*b* comprises for each locking element 42*b*, 44*b* one form-fit element 46*b*, 48*b* in which the corresponding locking element 42*b*, 44*b* engages in a form-fitting manner for locking. The form-fit elements 46*b*, 48*b* are implemented as recesses. The form-fit elements 46*b*, 48*b*, in particular in the direction of movement of the door unit 22*b*, have an extent that is larger than a corresponding extent of the locking elements 42*b*, 44*b*. As a result, a corresponding locking element 42*b*, 44*b* that engages in the form-fit element 46*b*, 48*b* has a defined freedom of movement in the form-fit element 46*b*, 48*b*. The locking device 28*b* comprises a locking base body 50*b*.

The form-fit elements 46*b*, 48*b* are incorporated in the locking base body 50*b*. The form-fit elements 46*b*, 48*b* are incorporated in an upper side of the locking base body 50*b*. The two form-fit elements 46*b*, 48*b* are preferably implemented conjointly. The two form-fit elements 46*b*, 48*b* are implemented as a common recess 52*b*. The locking base body 50*b* in the exemplary embodiment shown is preferably fixedly connected to the door unit 22*b*. The locking base body 50*b* is attached to an inner side of the door unit 22*b*. The locking base body 50*b* is preferably screwed to the door unit 22*b*. The locking base body 50*b* forms a surface that is elevated in relation to the inner side of the door unit 22*b*.

The electrically and/or electronically actuatable actuator device 56*b* is configured to be electrically and/or electronically actuated for unlocking the door unit 22*b*. The locking device 28*b* comprises an actuation switch 60*b*. The actuation switch 60*b* is configured to emit a trigger signal which is configured to actuate the actuator device 56*b*. An electrical and/or electronic actuation of the actuator device 56*b* is identical to the first exemplary embodiment and will therefore not be described in more detail here.

The aircraft seat module comprises a sensor device 64*b* which is configured at least to detect the door unit 22*b* in the open position. The sensor device 64*b* is embodied as a door position sensor. The sensor device 64*b* is configured to detect if the door unit 22*b* is disposed in the open position thereof and is correspondingly able to be locked by the locking device 28*b*. The sensor device 64*b* here can preferably also be realized as a feeler element which in the open position of the door unit 22*b* is activated by a corresponding detent. In principle, it is also conceivable that the sensor device 64*b* is realized as a contactless sensor device.

The aircraft seat module comprises a spring device 68*b* which is configured to subject the door unit 22*b* to a spring force. The spring device 68*b* comprises two spring elements 70*b*, 72*b*. In principle, only one spring element 70*b*, 72*b* is also conceivable. The spring device 68*b* in functional terms is disposed between the door unit 22*b* and the enclosure unit 14*b*. The spring device 68*b* is configured to exert a spring force acting in the closing direction 38*b* on the door unit 22*b*. The spring device 68*b* is configured to exert, in an open position of the door unit 22*b*, a spring force on the door unit 22*b* so as to assist a closing movement of the door unit 22*b*. In a displacement of the door unit 22*b* in the opening direction 40*b* from the closed position, in order for the locking device 28*b* to be unlocked by means of the actuation switch 60*b*, the spring device 68*b* is compressed. As a result, a spring force, by way of which a closing movement of the door unit 22*b* is advantageously assisted, can be advantageously increased by the displacement of the door unit 22*b* in the opening direction 40*b*.

As opposed to the first exemplary embodiment, the locking device additionally comprises a locking state indication unit 74*b*. The locking state indication unit 74*b* is configured to detect and indicate, at least in the maximally open position of the door unit 22*b*, incomplete locking of at least one of the two locking elements 42*b*, 44*b*. The locking state indication unit 74*b* is configured to detect and indicate incomplete locking of the locking device 28*b* when at least one of the two locking elements is incompletely locked. The locking state indication unit 74*b* is configured to detect and indicate incomplete locking of the locking device 28*b* when only one of the locking elements 42*b*, 44*b* is incompletely locked. As a result of the detection of incomplete locking of one of the locking elements 42*b*, 44*b*, it can be identified at an advantageously early stage when one of the locking elements 42*b*, 44*b* is defective and can no longer be correctly locked, although the door unit 22*b* in the open position is locked by a correctly locked locking element 42*b*, 44*b*. A repair or a replacement of the one locking element 42*b*, 44*b* can be initiated at an advantageously early stage as a result, so that the failure of the other locking element 42*b*, 44*b* and thus the simultaneous defect of both locking elements 42*b*, 44*b* resulting therefrom can advantageously be avoided.

The locking state indication unit 74*b* is configured to indirectly detect and indicate incomplete locking of one of the locking elements 42*b*, 44*b*. The locking state indication unit 74*b* is configured to permit, in the event of incomplete locking of one of the locking elements 42*b*, 44*b*, a displacement of the locked door unit 22*b* by an indication length 76*b* in the closing direction 38*b*. In the process, the door unit 22*b* is displaceable by the indication length 76*b*, although said door unit 22*b* is locked by one of the locking elements 42*b*, 44*b*. In the event of incomplete locking of the door unit 22*b* by the locking device 28*b*, thus when one of the two locking elements 42*b*, 44*b* is incompletely locked, the door unit 22*b* is displaceable by the indication length 76*b* in the closing direction 38*b*. In the event of complete locking of the door unit 22*b* by means of the locking device 28*b*, thus when both locking elements 42*b*, 44*b* are completely locked, the door unit 22*b* is not able to be displaced in the closing direction 38*b*. The displacement of the door unit 22*b* by the indication length 76*b* in the closing direction 38*b*, in the event of incomplete locking of the locking device 28*b*, is indicated by the spring force of the spring device 68*b*. The spring device 68*b*, when the locking device 28*b* is not correctly locked as a result of the incomplete locking of a locking element 42*b*, 44*b*, pushes the door unit 22*b* by the indication length 76*b* in the closing direction 38*b*. The indication length 76*b* by which the door unit 22*b* is displaced for detecting incomplete locking, is preferably 5 mm. In principle, it is also conceivable that the indication length 76*b* is a value between 20 mm and 1 mm, for example 15 mm, 10 mm, 3 mm, or 1.5 mm.

The locking state indication unit 74*b* comprises a rocker element 78*b*. The rocker element 78*b* is configured to contact the locking elements 42*b*, 44*b* in the locking position thereof. In a locked state of the door unit 22*b* in the open position thereof, the locking elements 42*b*, 44*b* in a completely locked state bear on the rocker element 78*b*. As a result of both locking elements 42*b*, 44*b* bearing thereon in the completely locked state, the rocker element 78*b* is held in a non-deflected neutral position. The rocker element 78*b* is disposed so as to be pivotable in relation to the locking base body 50*b*. The locking state indication unit 74*b* has an attachment frame 80*b* for attaching the rocker element 78*b*. The attachment frame 80*b* is attached to the locking base body 50*b*. In principle, it would also be conceivable that the attachment frame 80*b* is implemented integrally with the locking base body 50*b*. The attachment frame 80*b* is disposed on a side of the locking base body 50*b* that faces the actuator device 56*b*. The attachment frame 80*b* has a through opening 82*b* which is larger than the recess 52*b* in the locking base body 50*b* which forms the form-fit elements 46*b*, 48*b*. The through opening 80*b* permits access to the form-fit elements 46*b*, 48*b* formed by the recess 52*b*. The locking elements 42*b*, 44*b* in a completely locked state extend through the through opening 82*b* of the attachment frame 80*b* into the form-fit elements 42*b*, 44*b* formed by the recess 52*b*. The rocker element 78*b* is connected to the attachment frame 80*b*. The rocker element 78*b* is pivotably connected to the attachment frame 80*b*. The rocker element 78*b* is supported on the attachment frame 80*b* so as to be pivotable around a pivot axis. The pivot axis around which the rocker element 78*b* is supported runs coaxially with the movement axes of the locking elements 42*b*, 44*b*. The pivot axis, measured perpendicularly, has an identical spacing from the movement axes of the locking elements 42*b*, 44*b*. The pivot axis is preferably disposed so as to be centric between the form-fit elements 46*b*, 48*b* embodied by the recess 52*b*. The rocker element 78*b* is preferably attached on a central axis of the recess 52*b*. The rocker element 78*b*, by way of a bearing pin 84*b*, is pivotably connected to the attachment frame 80*b*. The bearing pin 84*b* implements the pivot axis.

The rocker element 78*b* is embodied as a flat plate. The rocker element 78*b* has a bearing side 86*b*. The bearing side 86*b* of the rocker element 78*b* in an assembled state faces the recess 52*b* which implements the form-fit elements 46*b*, 48*b*. The bearing side 86*b* in the neutral position is aligned so as to be parallel to a first side of the recess 52*b*. The locking elements 42*b*, 44*b* in the completely locked position thereof bear on the bearing side 86*b* on the rocker element 78*b*. In a position in which the locking elements 42*b*, 44*b* engage in the form-fit elements 46*b*, 48*b*, the bearing side 86*b* of the rocker element 78*b* delimits a movement of the door unit 22*b* in the closing direction 38*b*. The locking elements 42*b*, 44*b* in the completely locked position are supported on the rocker element 78*b* by way of the bearing side 86*b*. The rocker element 78*b* implements a form-fit element of the locking device 28*b* for the locking elements 42*b*, 44*b*. In a completely locked state of the locking device 28*b*, in which both locking elements 42*b*, 44*b* are completely locked, the rocker element 78*b* forms a common form-fit element for the locking elements 42*b*, 44*b* (see FIG. 3). The rocker element 78*b* here is in the neutral position thereof when both locking elements 42*b*, 44*b* are completely locked. The two locking elements 42*b*, 44*b*, when both are completely locked, keep the pivotably supported rocker element 78*b* balanced, in particular in the neutral position. To this end, the rocker element 78*b* on the bearing side 86*b* thereof has contacting regions on which the locking elements 42*b*, 44*b* bear. The contacting regions have in each case a spacing of identical size from the pivot axis around which the rocker element 78*b* is supported. The two contact regions, one of the locking elements 42*b*, 44*b* bearing in each case thereon, are disposed on mutually opposite sides of the pivot axis of the rocker element 78*b*. The rocker element 78*b* has radiuses in lateral edge regions 92*b*, 94*b* of the bearing side 86*b*. In a tilted state of the rocker element 78*b*, a space through which the not completely locked locking element 42*b*, 44*b* can be moved past the rocker element 78*b* into the recess 52*b* can be achieved as a result of the radiuses (see FIG. 5). In this way, repairing the not completely locked locking element 42*b*, 44*b* can easily take place.

The rocker element 78*b*, in the event of incomplete locking of one of the locking elements 42*b*, 44*b*, is configured to be tilted by the other, completely locked locking element 42*b*, 44*b* and, as a result, to permit a displacement of the locked door unit 22*b* by the indication length 76*b* in the closing direction 38*b*. If one of the two locking elements 42*b*, 44*b* is not completely locked and does not engage in the recess 52*b* that realizes the form-fit elements 46*b*, 48*b*, only the one completely locked locking element 42*b*, 44*b* thus bears on the rocker element 78*b*, in particular on the bearing side 86*b* of the rocker element 78*b*. It is shown by way of example in FIG. 4 how only the upper locking element 42*b* is completely locked and the lower locking element 44*b*, for example as a result of a defect, is not completely locked. The completely locked locking element 42*b* engages in the recess 52*b* of the locking base body 52*b*. The not completely locked locking element 44*b* does not engage in the recess 52*b* of the locking base body 50*b*. The not completely locked locking element 44*b* is in its unlocking position. As a result, only the completely locked locking element 42*b* intersects the rocker element 78*b* and comes into contact with the latter. The other, not completely locked locking element 44*b* does not come into contact with the rocker element 78*b*. The rocker element 78*b*, as a result of the locked locking element 42*b* by bearing on one side thereon, loses balance and is pivoted by the spring force of the spring device 68*b*, the latter acting in the closing direction 38*b* on the door unit 22*b*. As a result of being pivoted, the rocker element 78*b* releases a path by way of which the door unit 22*b* can be displaced by the indication length 76*b* until the completely locked locking element 42*b* bears on a wall of the recess 52*b*, which implements the corresponding form-fit element 46*b*. The bearing face of the form-fit elements 42*b*, 44*b* in the closing direction 38*b* is spaced apart from the bearing side 86*b* of the rocker element 78*b* in the neutral position by the indication length. As a result of only one of the locking elements 42*b*, 44*b* bearing thereon on one side during tilting of the rocker element 76*b*, a displacement of the door unit 22*b* by the indication length 76*b* in the closing direction 38*b* can thus take place as a result of the spring force of the spring device 68*b*.

The locking state indication unit 74*b* comprises a sensor device 88*b* which is configured to indirectly detect incomplete locking of one of the locking elements 42*b*, 44*b*. The sensor device 88*b* is configured in particular to detect a displacement of the door unit 22*b* by the indication length 76*b* in the closing direction 38*b*. The sensor device 88*b* is configured to emit a malfunction signal when the door unit 22*b* is displaced by the indication length in the closing direction 38*b*. The control apparatus 62*b* is configured to evaluate the malfunction signal of the sensor device 88*b*. By evaluating the malfunction signal of the sensor device 88*b*, the control apparatus 62*b* can advantageously determine a displacement of the door unit 22*b* by the indication length 76*b* and, as a result, detect incomplete locking of one of the two locking elements 42*b*, 44*b*. The sensor device 88*b* is implemented integrally with the sensor device 64*b* of the aircraft seat module, which is realized as a door sensor unit. As a result, the sensor device 64*b* can advantageously be used for the locking state indication unit 74*b*, and components can thus be saved. In principle, it would of course also be conceivable that the locking state indication unit 74*b* has a separately implemented sensor which detects a displacement of the door unit 22*b* by the indication length 76*b* in the closing direction 38*b*.

The locking state indication unit 74*b* has an indication unit 90*b*. The indication unit 90*b* is configured to indicate incomplete locking of one of the two locking elements 42*b*, 44*b*. The indication unit 90*b* is configured to emit a visual signal if one of the two locking elements 42*b*, 44*b* is incompletely locked. The indication unit 90*b* is preferably configured to display at least two different output signals so as to indicate incomplete locking of one of the locking elements 42*b*, 44*b*, on the one hand, and complete locking of both locking elements 42*b*, 44*b*, on the other hand. The indication unit 90*b* is embodied as an illumination element. The indication unit 90*b* that is embodied as an illumination element is configured to display at least two different colors. The indication unit 90*b* is configured, in the event of incomplete locking of one of the locking elements 42*b*, 44*b*, to emit a red light, for example, and a green light in the event of complete locking of both locking elements 42*b*, 44*b*. In principle, it is also conceivable that the indication unit 90*b* emits only one signal if one of the two locking elements 42*b*, 44*b* is not completely locked. In principle, it is likewise conceivable that the indication unit 90*b* is of a different implementation and emits a different visual, acoustic and/or haptic output signal. The indication unit 90*b* is disposed in an upper region of the door unit 22*b* separately from the locking elements 42*b*, 44*b*. As a result, the indication unit 90*b* is advantageously disposed at a height which can readily be seen by a person, for example a crew member. In principle, it is also conceivable that the indication unit 90*b* is disposed in an upper region of the enclosure unit 14*b*.

The locking state indication unit 74*b* preferably has a further indication unit 108*b*. The further indication unit 108*b* is of a purely mechanical implementation. The further indication unit 108*b* is preferably partially implemented by the door unit 22*b*. The further indication unit 108*b* has a first marking which is disposed on the door unit 22*b*. The indication unit 104*b* has a second marking which is disposed on the enclosure unit 14*b*. In a completely open position of the door unit 22*b*, in which both locking elements 42*b*, 44*b* are completely locked, the two markings of the indication unit 108*b* are congruent. If the door unit in a locking position of the door unit is displaced by the indication length 76*b*, because one of the two locking elements 42*b*, 44*b* is not completely locked, the markings of the indication unit 108*b* are no longer congruent as a result of which incomplete locking of one of the two locking elements 42*b*, 44*b* is indicated.

In principle, it is also conceivable that the purely mechanical indication unit 108*b* has a viewing window in the door unit 22*b*, said viewing window in the event of a displacement of the door unit 22*b* by the indication length in the closing direction 38*b* being disposed so as to be congruent with an indication marking which in this instance can be seen from the aisle region 20*b*.

In an alternative design embodiment, it would in principle also be conceivable that the locking state indication unit 74*b* described above is of a purely mechanical implementation and has only the purely mechanical further indication unit 104*b*. In principle, it is also conceivable that the purely mechanical indication unit 104*b* can be dispensed with.

Figure 12:
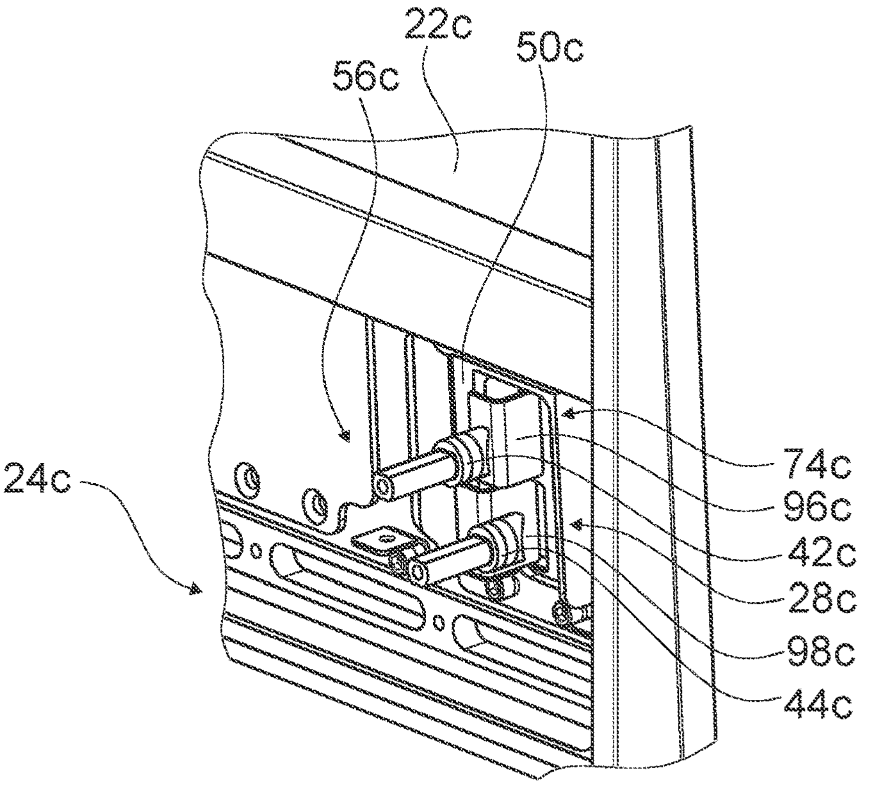
FIG. 12 shows a schematic illustration of a locking state indication unit in a third exemplary embodiment, which is of a purely mechanical implementation.
Figure 13:
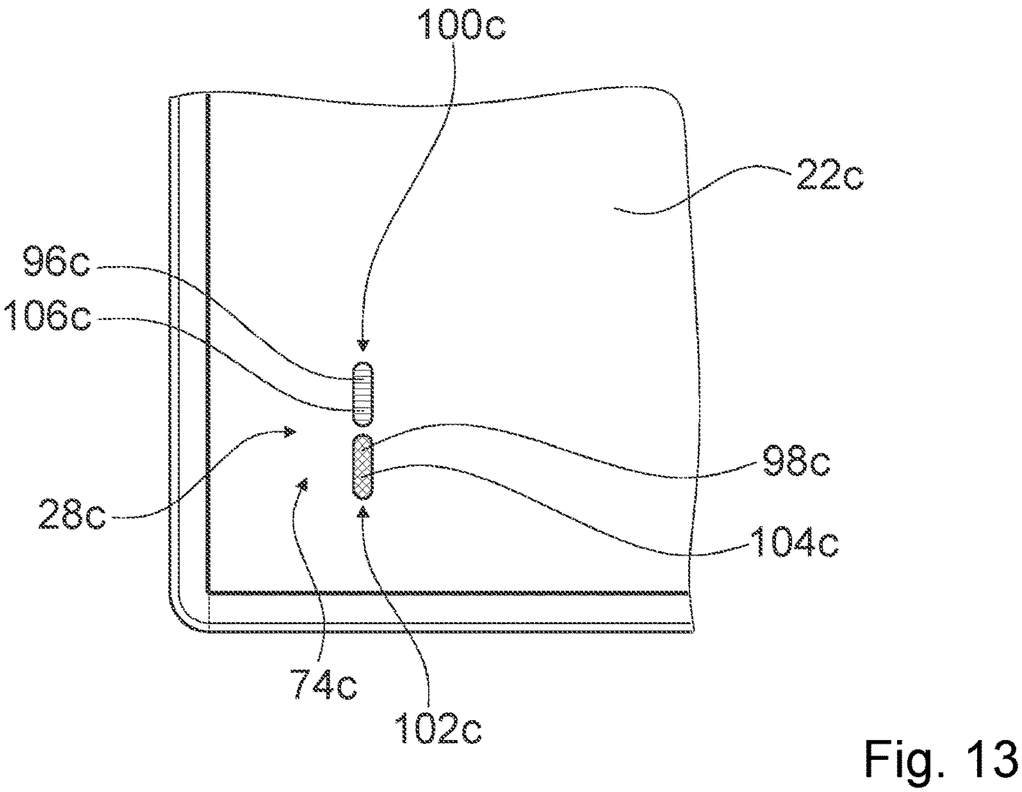
FIG. 13 shows a further view of the door unit having a locking state indication unit in the second exemplary embodiment.

FIGS. 12 and 13 show part of an aircraft seat module in a third exemplary embodiment. The aircraft seat module comprises a door unit 22*c*. The door unit 22*c* is configured to, at least in one operating state, at least partially delimit a flight passenger seating area 10*c* from a contiguous cabin area, in particular an aisle region 20*c*. The aircraft seat module has a bearing device 24*c* for supporting the door unit 22*c*. The door unit 22*c* is displaceable between the open position and the closed position by means of the bearing device 24*c*. The aircraft seat module comprises a locking device 28*c*. The locking device 28*c* is configured to lock the door unit 22*c* in the maximally open stowage position. The locking device 28*c* comprises an electrically and/or electronically actuatable actuator device 56*c*. The actuator device 56*c* comprises a first locking element 42*c*. The actuator device 56*c* comprises a second locking element 44*c*.

Figure 7:
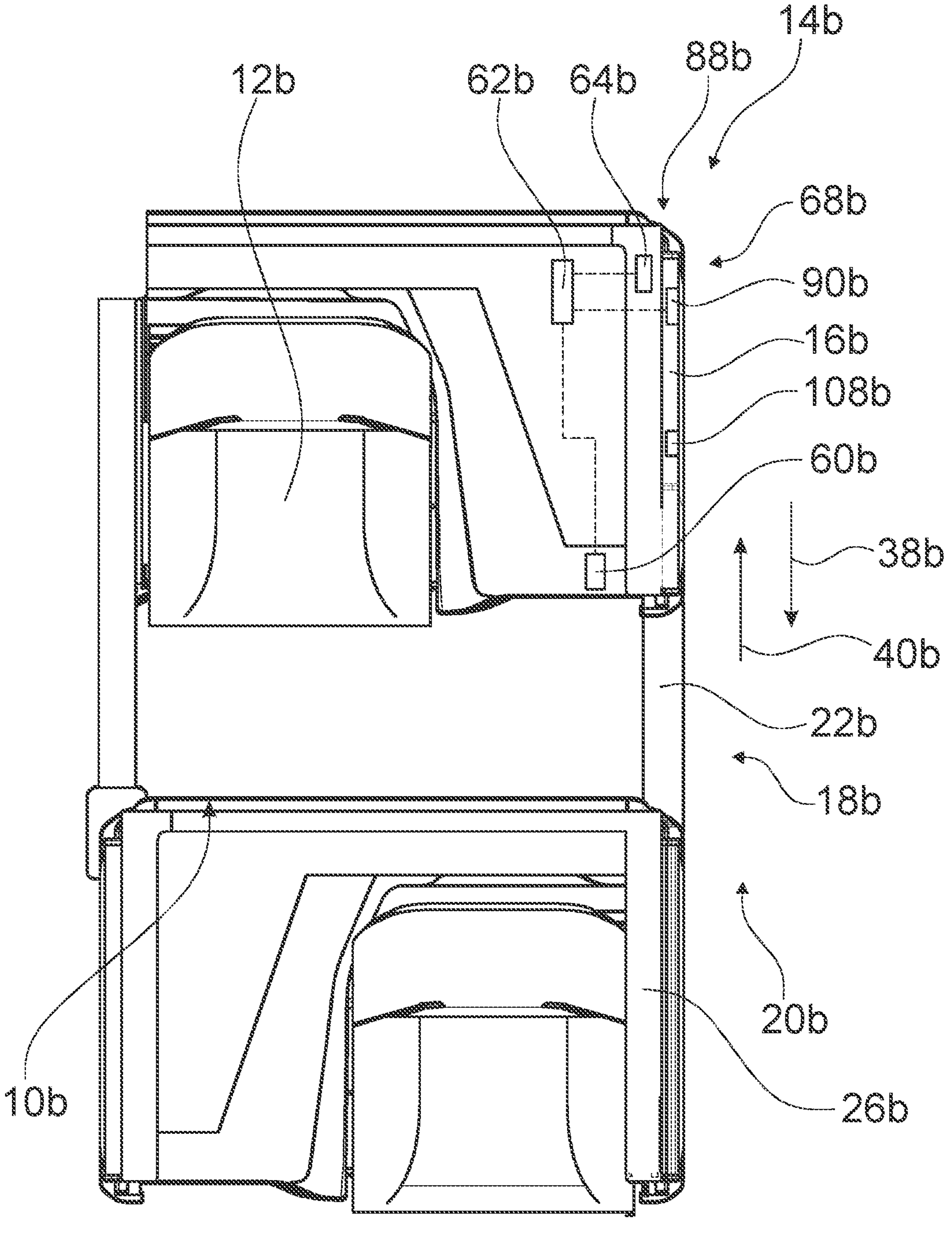
FIG. 7 shows a schematic view of an aircraft seat module in a second exemplary embodiment, having an enclosure unit and a door unit.
Figure 8:
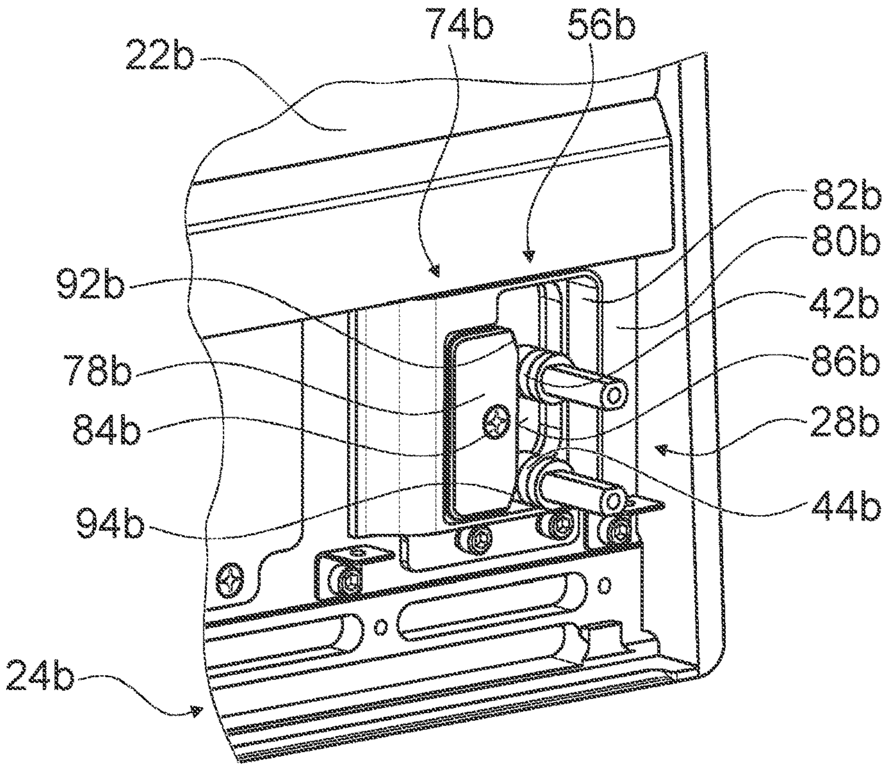
FIG. 8 shows a schematic view of a locking device having two locking elements in the locking position thereof and a locking state indication unit.
Figure 9:
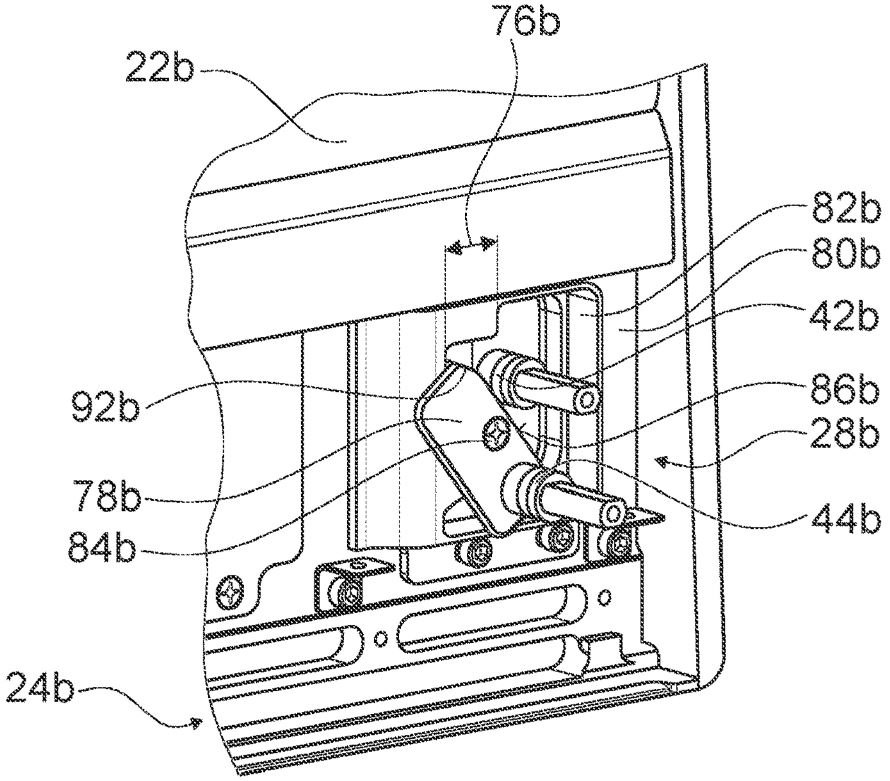
FIG. 9 shows a schematic illustration of the locking device and of the locking state indication unit, having a locking element which is not completely locked.
Figure 10:
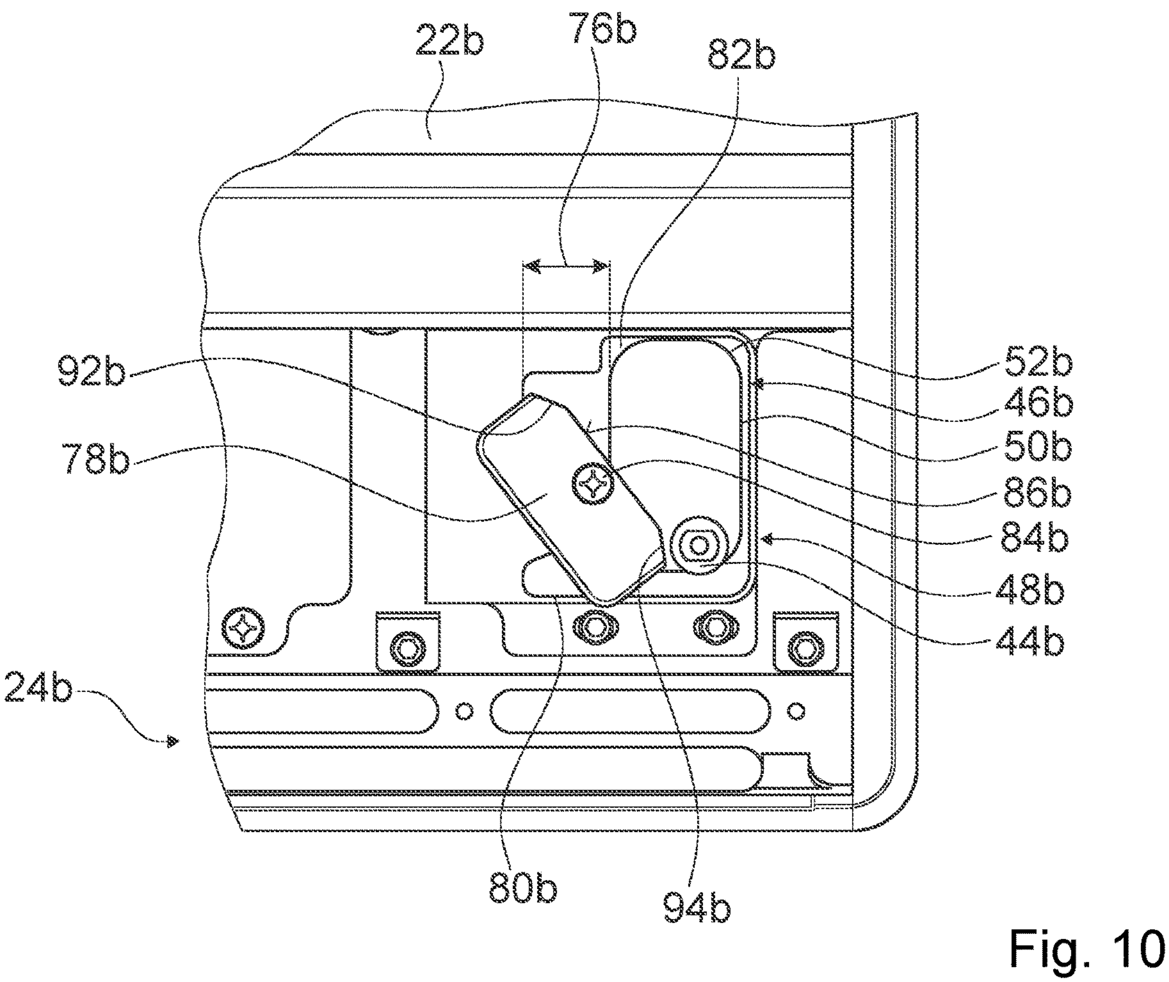
FIG. 10 shows a further schematic illustration of the locking device and of the locking state indication unit, having a locking element which is not completely locked.
Figure 11:
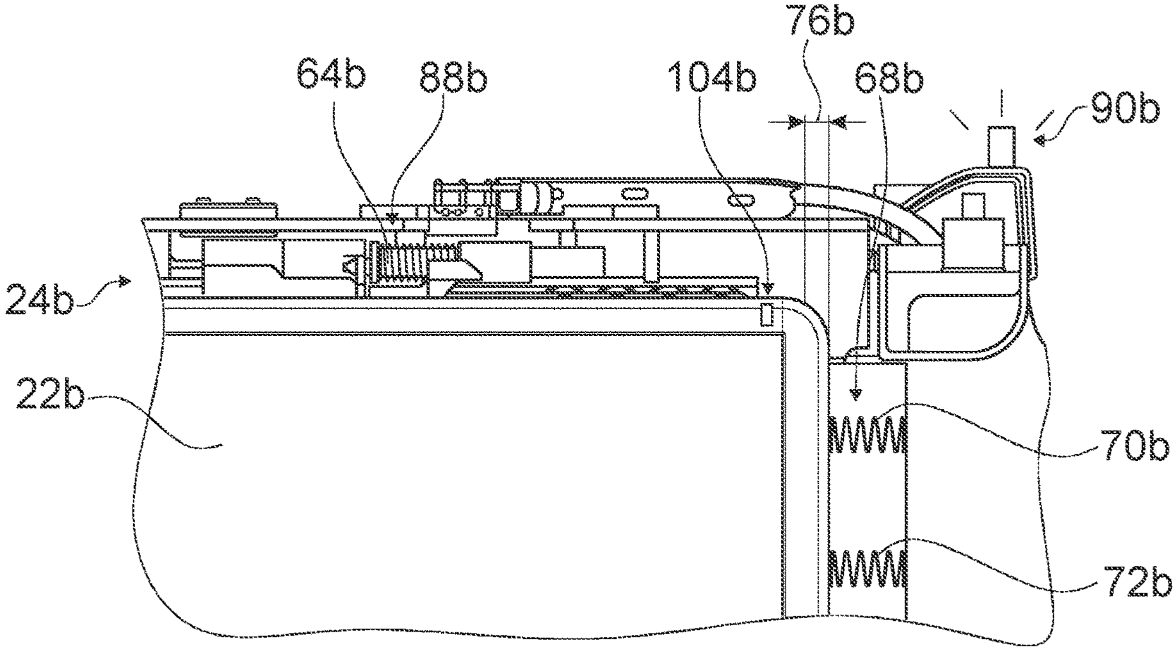
FIG. 11 shows a schematic illustration of the door unit, having a sensor device which is embodied as a door sensor.

The locking device comprises a locking state indication unit 74*c*. The locking state indication unit 74*c* is configured to detect and indicate, at least in the maximally open position of the door unit 22*c*, incomplete locking of at least one of the two locking elements 42*c*, 44*c*. FIGS. 7 and 8 show an alternative design embodiment of the locking state indication unit 74*c*. Instead of indirectly detecting incomplete locking of a locking element 42*c*, 44*c*, the locking state indication unit 74*c* of the second exemplary embodiment is configured to detect incomplete locking of a locking element 42*c*, 44*c* directly on the corresponding locking element 42*c*, 44*c*. As opposed to the first exemplary embodiment, the locking state indication unit 74*c* is of a purely mechanical implementation.

The locking state indication unit 74*c* has for each locking element 42*c*, 44*c* one spring-loaded indication element 96*c*, 98*c*, the latter two being configured to be deflected, in the event of the door unit 22*c* being locked by the respective locking element 42*c*, 44*c* in the locking position thereof from a first position to a second position. The spring-loaded indication elements 96*c*, 98*c* are attached so as to be movable, in particular pivotable, on a locking base body 50*c* of the locking module. In principle, it would also be conceivable that the indication elements 96*c*, 98*c* are movably attached to the door unit. The indication elements 96*c*, 98*c* are configured to be adjusted by in each case one of the locking elements 42*c*, 44*c* during the adjustment of the latter to the locking position. In a neutral position, the indication elements 96*c*, 98*c* are in a first position which realizes a first indication position. The respective indication element 96*c*, 98*c* in the first indication position indicates a locking element that has been moved incompletely or not into the locking position. To this end, a first visible face 104*c*, which is colored red, for example, is visible in the first indication position. In the second position, which realizes a second indication position, the indication elements 96*c*, 98*c* are adjusted by the respective locking element. The respective indication element 96*c*, 98*c* in the second indication position indicates that the respective locking element 42*c*, 44*c* is completely locked. To this end, a second visible face 106*c*, which is colored green, for example, is visible in the second indication position. The locking state indication unit 74*c* has for each spring-loaded indication element 96*c*, 98*c* one viewing window 100*c*, 102*c* through which a position of the respective indication element 96*c*, 98*c* can be seen. Depending on a position of the indication elements 96*c*, 98*c*, the one of the two visible faces 104*c*, 106*c* to be indicated of the respective indication element 96*c*, 98*c* can in each case be seen through the viewing windows 100*c*, 102*c*.

The invention claimed is:

1. An aircraft seat module comprising:

an enclosure unit which at least partially delimits a flight passenger seating area, and having
- a door unit which at least in an operating state is at least configured to close a passage region to the flight passenger seating area,
- a bearing device which is configured to support the door unit so as to be movable between an open position and a closed position in relation to the enclosure unit, and
- a locking device which is configured to lock the door unit in the open position and for this purpose has at least one electrically and/or electronically actuatable actuator device, which is at least configured to be electrically and/or electronically actuated for an unlocking of the door unit, wherein the actuator device comprises
- an actuator,
- a first locking element, and
- a second locking element, and wherein the two locking elements can be adjusted from their locking position to their unlocking position by an activation of the actuator.

2. The aircraft seat module as claimed in claim 1, wherein the locking device has at least one actuation switch which is configured to be activated by a movement of the door unit, and the actuator device is actuatable by the activation of said actuation switch.

3. The aircraft seat module as claimed in claim 2, wherein the actuation switch is activatable by a movement of the door unit in an opening direction of the door unit.

4. The aircraft seat module as claimed in claim 1, wherein the locking device in a non-energized state of the electrically and/or electronically actuatable actuator device is configured to assume a locking position.

5. The aircraft seat module as claimed in claim 1, wherein the locking device in a non-energized state of the actuator device is configured to lock the door unit in the open position.

6. The aircraft seat module as claimed in claim 1, wherein the door unit in a non-energized state of the actuator device is configured to be brought into its open position and to be locked in the open position.

7. The aircraft seat module as claimed in claim 1, wherein the actuator device is configured to be deactivated in a centrally controlled manner so as to in at least one operating state prevent an unlocking of the door unit.

8. The aircraft seat module at least as claimed in claim 1, further comprising a sensor device which is configured at least to detect the door unit in the open position.

9. A system of at least two aircraft seat modules as claimed in claim 1, further comprising a central control unit, which in at least one operating state is configured to deactivate in a centrally controlled manner actuator devices of two or more of the at least two aircraft seat modules.

10. The aircraft seat module as claimed in claim 1, wherein the locking elements of the actuator device are in each case implemented so as to be spring-loaded.

11. The aircraft seat module as claimed in claim 10, wherein the actuator device has for each locking element a spring element which in each case subjects the locking elements to a spring force in one direction.

12. The aircraft seat module as claimed in claim 1, wherein the locking elements are implemented by means of spring elements such that their locking position realizes a neutral position into which the locking elements are automatically adjusted.

13. The aircraft seat module as claimed in claim 1, wherein the actuator device comprises a locking base body, and wherein in the locking base body, form-fit elements of the actuator device are incorporated into which the respective locking element engages in a form-fit manner for a locking, the two form-fit elements being realized as a common recess.

14. The aircraft seat module as claimed in claim 13, wherein the locking base body is disposed on an inner side of the door unit and forms a surface which is elevated in relation to the inner side of the door unit.

15. The aircraft seat module as claimed in claim 13, wherein the locking base body forms on a first side an oblique face, embodied as an oblique activation face, which is configured, when the door unit is set to its open position, to move the locking elements from their locking position to their unlocking position, just before the open position is reached.

16. The aircraft seat module as claimed in claim 1, wherein the actuator controls the operation of the first and second locking elements in unison.

17. An aircraft seat module comprising:

an enclosure unit which at least partially delimits a flight passenger seating area, and having a door unit which at least in an operating state is at least configured to close a passage region to the flight passenger seating area, a bearing device which is configured to support the door unit so as to be movable between an open position and a closed position in relation to the enclosure unit, and a locking device which is configured to lock the door unit in the open position and for this purpose has at least one electrically and/or electronically actuatable actuator device, which is at least configured to be electrically and/or electronically actuated for an unlocking of the door unit, wherein the actuator device comprises a base body, an actuator, a first locking element, and a second locking element, wherein the two locking elements can be adjusted from their locking position to their unlocking position by an activation of the actuator, and wherein first and second locking elements are arranged to be movable within the base body.

18. An aircraft seat module comprising:

an enclosure unit which at least partially delimits a flight passenger seating area, and having a door unit which at least in an operating state is at least configured to close a passage region to the flight passenger seating area, a bearing device which is configured to support the door unit so as to be movable between an open position and a closed position in relation to the enclosure unit, and a locking device which is configured to lock the door unit in the open position and for this purpose has at least one electrically and/or electronically actuatable actuator device, which is at least configured to be electrically and/or electronically actuated for an unlocking of the door unit, wherein the locking device further comprises locking state indication unit, wherein the actuator device comprises an actuator, a first locking element, and a second locking element, wherein the two locking elements can be adjusted from their locking position to their unlocking position by an activation of the actuator, wherein the locking state indication unit is configured to detect and indicate at least in a maximally open position of the door unit, a condition of incomplete locking of at least one of the first and second locking elements, and wherein the locking state indication unit is configured to detect and indicate incomplete locking of the locking device when at least one of the first and second locking elements is incompletely locked.

* * * * *